United States Patent
Jia et al.

(10) Patent No.: US 11,507,269 B2
(45) Date of Patent: Nov. 22, 2022

(54) TECHNOLOGIES FOR INDICATING THIRD PARTY CONTENT AND RESOURCES ON MOBILE DEVICES

(71) Applicant: AppEsteem Corporation, Bellevue, WA (US)

(72) Inventors: Hong Jia, Bellevue, WA (US); Dennis Batchelder, Seattle, WA (US); Keven Goh, Bellevue, WA (US); Nicholas Batchelder, Seattle, WA (US); Daniel Ivanov, Redmond, WA (US); Natalya Grebenik, Redmond, WA (US); Kira Brodsky, Redmond, WA (US); Bryan Young, Cle Elum, WA (US)

(73) Assignee: AppEsteem Corporation, Bellevue, WA (US)

( * ) Notice: Subject to any disclaimer, the term of this patent is extended or adjusted under 35 U.S.C. 154(b) by 198 days.

(21) Appl. No.: 16/853,804

(22) Filed: Apr. 21, 2020

(65) Prior Publication Data
US 2021/0326035 A1 Oct. 21, 2021

(51) Int. Cl.
*G06F 3/048* (2013.01)
*G06F 3/04883* (2022.01)
*G06F 9/451* (2018.01)
*G06N 20/00* (2019.01)

(52) U.S. Cl.
CPC .......... *G06F 3/04883* (2013.01); *G06F 9/451* (2018.02); *G06N 20/00* (2019.01)

(58) Field of Classification Search
CPC ...... G06F 3/04883; G06F 9/451; G06N 20/00
See application file for complete search history.

(56) References Cited

U.S. PATENT DOCUMENTS

| | | | | |
|---|---|---|---|---|
| 10,437,988 | B1* | 10/2019 | Newstadt | G06F 21/52 |
| 2005/0120238 | A1* | 6/2005 | Choi | G06F 21/566 |
| | | | | 726/26 |
| 2008/0189796 | A1* | 8/2008 | Linn | G06F 21/554 |
| | | | | 726/30 |
| 2011/0239141 | A1* | 9/2011 | Wang | G06F 9/451 |
| | | | | 715/763 |
| 2017/0242567 | A1* | 8/2017 | Lefor | G06F 3/0488 |
| 2017/0269953 | A1* | 9/2017 | Prey | G06F 9/45558 |
| 2019/0014087 | A1* | 1/2019 | Robinson | H04L 63/0272 |
| 2020/0084032 | A1* | 3/2020 | Brickell | G06F 21/602 |

(Continued)

*Primary Examiner* — David E Choi
(74) *Attorney, Agent, or Firm* — Schwabe, Williamson & Wyatt, P.C.

(57) ABSTRACT

Methods, systems, and storage media are provided for accessibility services to assist users with disabilities in using touch-based interfaces and graphical user interfaces (GUIs). A client system generates and renders a GUI of a client application that comprises one or more graphical objects. The client system operates a service to identify graphical objects that refer or link to advertisements or other third party resources. The service applies a protective measure to the identified graphical objects, which prevent user inputs (e.g., "taps") from being accepted by the client system. The protective measure may include a distinguishing effect to visually distinguish the protective measure from other graphical objects in the GUI. The user may remove the protective measure by performing a predefined gesture. Other embodiments may be described and/or claimed.

18 Claims, 16 Drawing Sheets

(56) References Cited

U.S. PATENT DOCUMENTS

| | | | | |
|---|---|---|---|---|
| 2020/0104004 A1* | 4/2020 | Yaginuma | ............. | G06F 3/0416 |
| 2020/0183713 A1* | 6/2020 | Verma | ................. | G06F 9/45558 |
| 2020/0412744 A1* | 12/2020 | Spurlock | ............. | H04L 63/1433 |
| 2021/0326035 A1* | 10/2021 | Jia | ....................... | G06F 3/04883 |

* cited by examiner

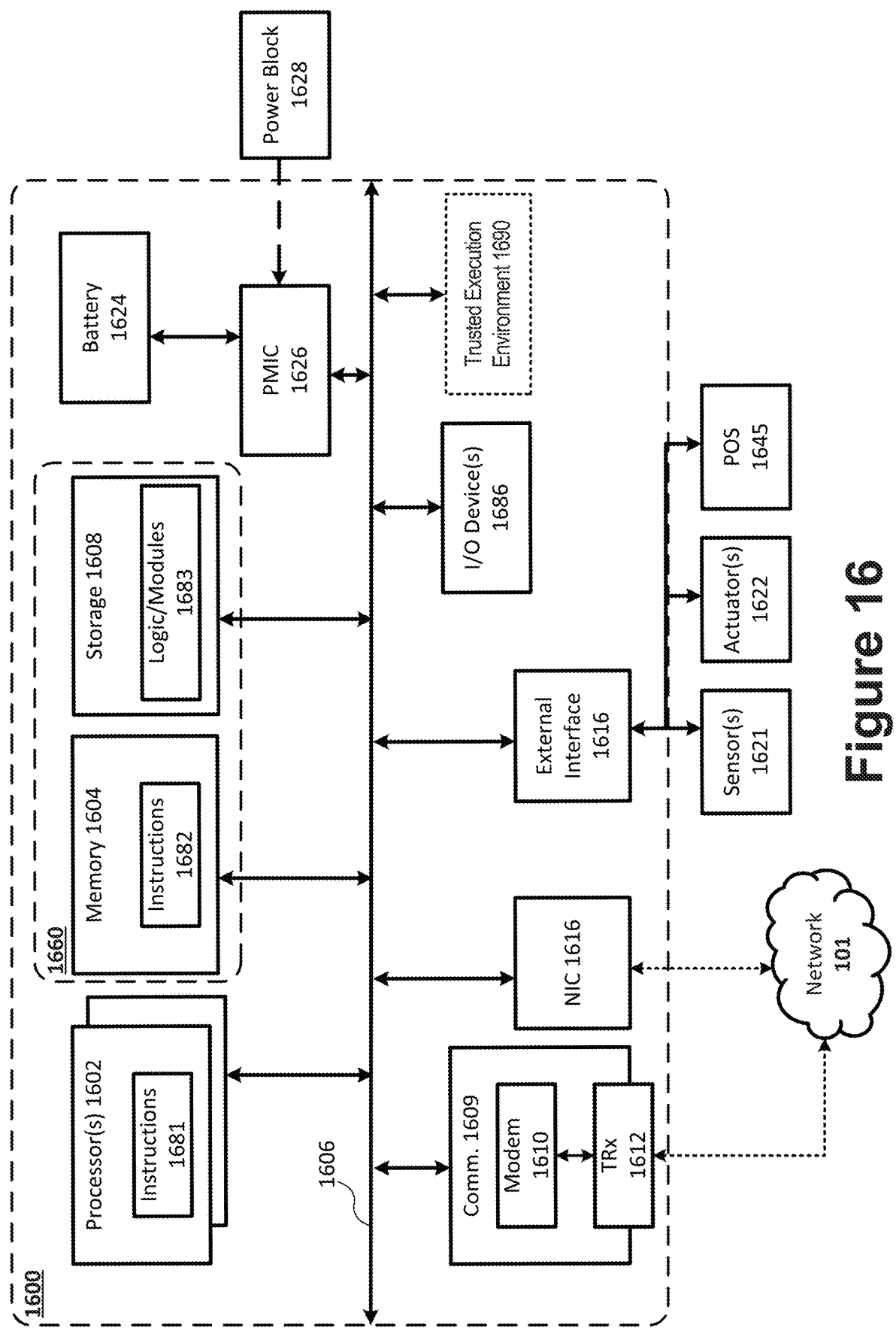

TECHNOLOGIES FOR INDICATING THIRD PARTY CONTENT AND RESOURCES ON MOBILE DEVICES

RELATED APPLICATIONS

The present application is related to U.S. application Ser. No. 16/240,950 filed on Jan. 7, 2019 titled "Technologies for Indicating Deceptive and Trustworthy Resources", and U.S. application Ser. No. 16/541,205 filed on Aug. 15, 2019 titled "Technologies for Indicating Third Party Content and Resources", the contents of each of which are incorporated by reference in their entireties.

FIELD

The present disclosure relates to the technical fields of touch-based interfaces and graphical user interfaces (GUIs), and in particular, to technologies for accessibility services to assist users with disabilities in using touch-based interfaces and GUIs.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mobile devices render and display webpages and/or web applications in response to user requests. The rendered and displayed webpages, applications (e.g., mobile applications or "apps"), and/or messages (including email, short message service (SMS) messages, and the like) may include content that is/are links or references to various web resources, such as other content or applications. Some of the content included in the rendered/displayed webpages, applications (apps), and/or messages may be advertisements ("ads") or spam messages. Some of these ads may be in the form of web banners (also referred to as "banners ads" or simply "banners") or pop-up ads (also referred to as "pop-ups"). Banners are typically graphical ads embedded and displayed within a webpage, app, or message. Pop-ups graphical user interfaces (GUIs) that suddenly appear (i.e., "pops up") in the foreground when an intended webpage, app, or message is loading or shortly after loading. Banner and pop-up ads may include rich media to incorporate video, audio, animations, buttons, forms, or other interactive elements using, for example, JavaScript, Java applets, HTML5, Adobe Flash, and/or the like. Many of these ads and spam are delivered by one or more ad servers owned and/or operated by an ad network. These ads and spam messages are usually mostly or entirely controlled by the ad network serving the ads and spam messages, with little or no control by the service or platform providing the displayed webpages/applications/messages. Ad networks often employ tracking mechanisms to determine or identify the types of ads and spam messages that obtain the highest click-through-rates (CTRs), as well as machine learning algorithms to generate and/or serve the same or similar types of ads in an attempt to obtain similarly high CTRs and thereby generate more revenue.

In many cases, ad networks will serve or publish trick banner ads, spam messages, and/or pop-up ads. Trick banner ads, pop-up ads, spam messages may imitate some graphical element users commonly encounter to induce clicks or impressions. Trick banners, pop-ups, and spam messages may imitate operating system messages, messages from popular applications, buttons, forms, and/or other interactive elements. Typically, trick banners, spam messages, and pop-ups employ "bait-and-switch" tactics since trick banners, spam messages, and pop-ups do not usually indicate that they are ads or spam messages, or mention the advertiser in the initial ad or spam message. However, some trick ads and spam messages, such as those appearing in email or SMS messages, may be designed in a way that is tempting to many users such as, for example, promising monetary rewards or some other benefit. As a result, trick banners, spam messages, and pop-ups commonly obtain higher CTRs than other types of ads and messages, despite the fact that most tricked users resent the advertiser for the deceptive behavior. Additionally, advertisers that utilize trick banners, spam messages, and pop-ups may have lower conversion rates than other types of banners, messages, and pop-up ads because the most tricked users did not actually intend to visit the advertiser's website.

Conventional solutions for removing trick banners, spam messages, and pop-ups, and/or other misleading/deceptive advertisements include ad blocking or ad filtering software. Many ad blockers/filters simply block or prevent image loading and autoplaying audio, video, and/or Flash animations. Other ad blockers/filters employ filter rules indicating blacklisted resources to block and/or indicating whitelisted resources to allow rendering and display. These solutions are disadvantageous because they can inadvertently disable features of the rendered and displayed webpages, apps, and messages, and in some cases, service providers may purposely disable access to their content and services unless the ad blockers are disabled.

These issues are exacerbated when the user system has a touch or gesture-based interface, for example, smartphones or tablets. This is because banner and/or pop-up ads for mobile platforms may include fake close buttons (e.g., a fake "X") and/or the like, to trick users into tapping the ad. Sometimes, banner and/or pop-up ads may be inadvertently selected due to difficulty in operating the touch-based interfaces, poor ad design, and/or the like. Additionally, users may inadvertently select a banner ad when attempting to scroll through a mobile webpage, app, or message, or interact with some other element in the mobile webpage, app, or message.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 16 illustrates an example computing system suitable for practicing various aspects of the present disclosure in accordance with various embodiments.

DETAILED DESCRIPTION

Figure 1:
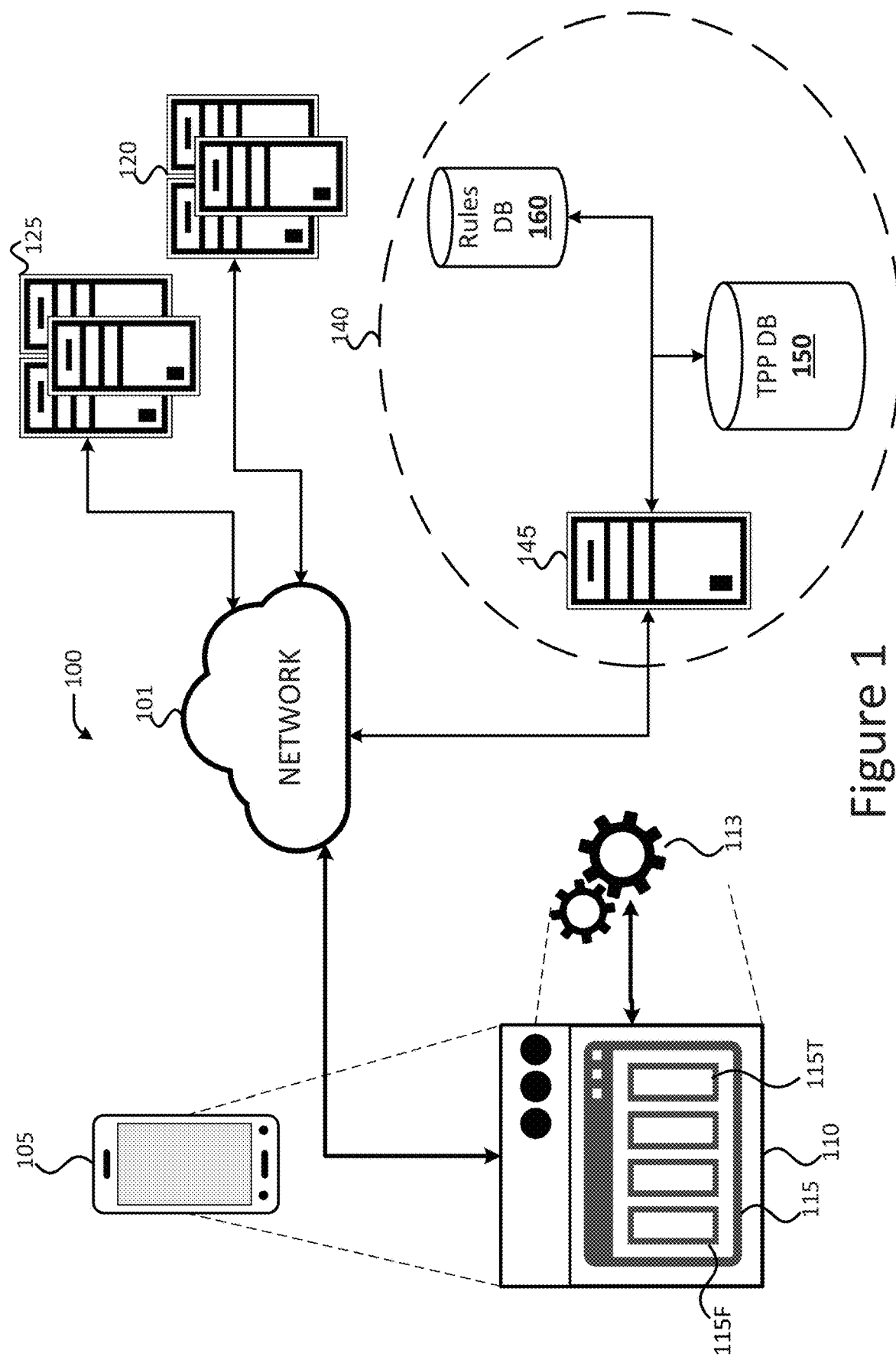
FIG. 1 illustrates an arrangement suitable for practicing various embodiments of the present disclosure.

Embodiments described herein are related to providing indications of third party content, services, and/or applications when communicating over a network, such as the Internet. In various embodiments, a user system operates an application that generates a graphical user interface (GUI), which overlays a visual indicator on top of rendered graphical objects based on a source of the resources represented by the graphical objects. The graphical objects (or simply "objects") include, for example, content items (e.g., text, images, video, etc.), links or references to resources, applications, graphical control elements, or any other graphical representation of information or data. The visual indicator indicates whether the source of the resource is provided by a third party platform or service, such as an advertising network ("ad network"). In many cases, graphical objects are designed to imitate interactive elements of the GUI, which may trick users into accessing associated resources by interacting with such graphical objects. These resources are often associated with advertiser content. In embodiments, when the source of a resource is provided by a third party platform or service that is different than the platform or service provider providing a currently displayed webpage, the visual indicator obfuscates a region of the GUI that includes the graphical object that represents that third party resource. The GUI allows a user of the user system to un-obfuscate the visual indicator using a graphical pointer or a desired gesture, depending upon the type of user system. In other words, the embodiments include mechanisms that add indicators directly onto graphical objects sourced from third party platforms or services (also referred to as "lures," "trick content," or the like) that represent content items and/or referenced resources (e.g., websites). These mechanisms add the indicators directly onto the third party graphical objects in a frictionless manner (as compared to existing approaches). Additionally, because the indicators are overlaid on top of the graphical objects, rather than preventing the graphical objects from being loaded and rendered as is the case with ad blockers or filters, the embodiments herein do not inadvertently disable the functionality of the rendered website or application.

Embodiments herein also improve user accessibility of mobile device or touch-based interfaces by guarding against mistaken or unintentional taps, blurring ads, and/or providing "safe close" mechanisms. Guarding against mis-tapping may involve placing a protective window over a portion of the screen to prevent taps from being detected, and permitting touches or gestures to be input when the guard is dismissed or closed. Additionally or alternatively, ads displayed on mobile devices are blurred, and a predefined touch motion or gesture is used to remove the blurring. Additionally or alternatively, a predefined gesture for closing pop-up ads may replace existing gestures to close windows or the like, which prevents mis-tapping on popup ads. Other embodiments are described and/or claimed.

Referring now to the figures, FIG. 1 shows an arrangement 100 suitable for practicing various embodiments of the present disclosure. As shown in FIG. 1, arrangement 100 includes a client system 105 (also referred to as a "client device", "client system", or the like), network 101, content or service provider platform (SPP) 120, third party platform (TPP) 125, and verification service 140. According to various embodiments, the client system 105 is configured to operate a client application 110 ("app 110") to obtain and render graphical objects 115 (or simply "objects 115") within the app 110, wherein the app 110 interacts with the verification service 140 to obfuscate or otherwise indicate objects 115 associated with third party resources such as those provided by TPP 125. Aspects of these embodiments are discussed in more detail infra.

The client system 105 includes physical hardware devices and software components capable of accessing content and/or services provided by the SPP 120 and verification service 140. The client system 105 can be implemented as any suitable computing system or other data processing apparatus usable by users to access content/services provided by the SPP 120 and verification service 140. In various embodiments, the client system 105 includes a touch-based user interface (UI), such as a touchscreen, touchpad, motion-capture interface, and/or the like. In most implementations, the client system 105 is a mobile device such as a mobile cellular phone (e.g., a "smartphone"), a tablet computer, a portable media player, a wearable computing device, a 2-in-1 personal computer (PC) or 2-in-1 tablet, or the like. However, in some implementations, the client system 105 may be some other computing system with a gesture-based interface such as laptops with a touchscreen display, an all-in-one desktop computer, and the like. The client system 105 communicates with systems 120 and 140 to obtain content/services using, for example, Hypertext Transfer Protocol (HTTP) over Transmission Control Protocol (TCP)/Internet Protocol (IP), or one or more other common protocols such as Extensible Messaging and Presence Protocol (XMPP); File Transfer Protocol (FTP); Secure Shell (SSH); Session Initiation Protocol (SIP) with Session Description Protocol (SDP), Real-time Transport Protocol (RTP), Secure RTP (SRTP), Real-time Streaming Protocol (RTSP), or the like; Simple Network Management Protocol (SNMP); Web Socket; Wireless Application Messaging Protocol (WAMP); User Datagram Protocol (UDP); QUIC (sometimes referred to as "Quick UDP Internet Connections"); Remote Direct Memory Access (RDMA); Stream Control Transmission Protocol (SCTP); Internet Control Message Protocol (ICMP); Internet Group Management Protocol (IGMP); Internet Protocol Security (IPsec); X.25; and/or the like.

As used herein, the term "content" refers to visual or audible information to be conveyed to a particular audience or end-user, and may include or convey information pertaining to specific subjects or topics. Content or content items may be different content types (e.g., text, image, audio, video, etc.), and/or may have different formats (e.g., text files including Microsoft® Word® documents, Portable Document Format (PDF) documents, HyperText Markup Language (HTML) documents; audio files such as MPEG-4 audio files and WebM audio and/or video files; etc.). As used herein, the term "service" refers to a particular functionality or a set of functions to be performed on behalf of a requesting party, such as the client system 105. As examples, a service may include or involve the retrieval of specified information or the execution of a set of operations. In order to access the content/services, the client system 105 includes components such as processors, memory devices, communication interfaces, and the like.

The SPP 120 and the TPP 125 include one or more physical and/or virtualized systems for providing content and/or functionality (i.e., services) to one or more clients (e.g., client system 105) over a network (e.g., network 101). The physical and/or virtualized systems include one or more logically or physically connected servers and/or data storage devices distributed locally or across one or more geographic locations. Generally, the SPP 120 is configured to use IP/network resources to provide web pages, forms, applications, data, services, and/or media content to client system 105. As examples, the SPP 120 may provide search engine services, social networking and/or microblogging services, content (media) streaming services, e-commerce services, cloud computing services, cloud analytics services, immersive gaming experiences, and/or other like services. Additionally or alternatively, the SPP 120 may provide on-demand database services, web-based customer relationship management (CRM) services, or the like. Additionally or alternatively, the SPP 120 may support communication services such as Voice-over-Internet Protocol (VoIP) sessions, PTT sessions, group communication sessions, and the like for the client system 105 via the network 101.

In order to provide content and/or services to the client system 105, the SPP 120 may operate web servers and/or applications servers. The web server(s) serve static content from a file system of the web server(s), and may generate and serve dynamic content (e.g., server-side programming, database connections, dynamic generation of web documents) using an appropriate plug-in or the like. The application server(s) implement an application platform, which is a framework that provides for the development and execution of server-side applications as part of an application hosting service. The application platform enables the creation, management, and execution of one or more server-side applications developed by the SPP 120 and/or third party application developers, which allow users and/or third party application developers to access the SPP 120 via respective client systems 105. The client system 105 may operate the app 110 to access the dynamic content, for example, by sending appropriate HTTP messages or the like, and in response, the server-side application(s) may dynamically generate and provide the code, scripts, markup documents, etc., to the app 110 to render and display objects 115 within the app 110. A collection of some or all of the objects 115 may be a webpage or application (app) comprising a graphical user interface (GUI) including graphical control elements (GCEs) for accessing and/or interacting with the SPP 120. This collection of objects 115 may be referred to as "webpage 115," "app 115," or the like. The server-side applications may be developed with any suitable server-side programming languages or technologies, such as PHP; Java™ based technologies such as Java Servlets, JavaServer Pages (JSP), JavaServer Faces (JSF), etc.; ASP.NET; Ruby or Ruby on Rails; Kotlin; and/or any other like technology such as those discussed herein. The applications may be built using a platform-specific and/or proprietary development tool and/or programming languages.

For purposes of the present disclosure, many example embodiments are described as being developed for use in the Android® mobile environment, and/or interacting with Android® apps 110/115. The embodiments herein are not limited to the Android® mobile environment and the examples described herein may be straightforwardly applied to other computing environments.

The Android® UI framework includes various UI elements. In Android®, a Surface is an object holding pixels that are composited to the screen. A window is an object is a rectangular area that includes a single surface in which the contents of the window is/are rendered. There can be multiple windows in one screen that are managed by a WindowManager. The Android® WindowManager is a system service that is responsible for managing the z-ordered list of windows, which windows are visible, and how they are laid out on the screen. Among other things, the WindowManager automatically performs window transitions and animations when opening or closing an app or rotating the screen. An app 110/115 interacts with the WindowManager to create windows, and the WindowManager creates a surface for each window and hands it over to the app 110/115 for drawing.

In Android®, (G)UI elements are built using View and ViewGroup objects. A View is an object that draws something on a screen and/or is an interactive (G)UI element inside of a window that defines the behavior of the window. View is the base class for widgets, which are used to create interactive UI components (e.g., buttons, text fields, etc.). Each View occupies a two-dimensional (2D) area (e.g., a rectangle) on the device (e.g., client system 105) screen and is responsible for drawing, framing, and event handling. A View has a location (e.g., within a display or viewing area) expressed as a pair of left and top coordinates, and two dimensions expressed as a width and a height. The unit for location and dimensions is the pixel. A ViewGroup is an object (or invisible container) that holds one or more View and/or other ViewGroup objects and defines their properties. A UI for each app component is defined using a hierarchy of View and/or ViewGroup objects, which may be stored and arranged into a tree data structure. Each ViewGroup is an invisible container that organizes child Views and/or and child View Groups, where the child Views may be control elements or widgets that draw some part of the UI.

View and ViewGroup objects of a UI may be arranged into a layout. A layout defines the visual structure of a UI, such as the UI for an activity or app widget. An Activity is an application component that provides a screen with which users can interact in order to perform some function, and an app widget is a miniature application View that can be embedded in other apps that can receive periodic updates. A layout can be declared by instantiating View and ViewGroup objects in code or declaring/defining UI elements using XML. All of the Views in a window or layout may be specified using one or more XML layout files. When using XML to define/declare UI elements, the XML element names correspond to class names and attribute names correspond to methods.

Every View and ViewGroup object supports their own variety of XML attributes. There are many specialized subclasses of views that act as controls/GCEs and/or are capable of displaying text, images, and/or other content. Additionally, views may have an associated integer ID (e.g., a view ID), which is typically assigned in layout XML files and are used to find specific Views within the tree data structure. Some attributes are layout parameters, which are attributes that describe certain layout orientations of the View object. XML layout attributes define layout parameters for a View that are appropriate for the ViewGroup in which it resides. The XML layout attributes/parameters are wrapped in a LayoutParams object, that is later used by a layout to position a particular view. LayoutParams are used by views to tell their parents how the view should be laid out.

A View's appearance is defined by a number of layout and View parameters, including position parameters (e.g., expressed as a pair of left and top coordinates and/or x and y coordinates), geometry parameters (e.g., width and height, or drawing with and drawing height, etc.), background specifies a drawable to use as the background of the View, elevation that defines the base z depth of the view, foreground that defines a drawable to draw over content, gravity parameters (e.g., foregroundGravity) that defines a gravity to apply to the foreground drawable, alpha to qualify and quantify the transparency of the View, among many others. The alpha property of a View is expressed as a value between 0 (completely transparent) and 1 (completely opaque). An opaque View guarantees that it will draw all the pixels overlapping its bounds using a fully opaque color. Furthermore, custom Views may be created by specifying the custom View in an XML element and specifying the View's appearance and behavior using element attributes, and extending the View class or its subclasses.

Android® also includes an overlay feature. An "overlay" is a UI element or layer that enables an app (e.g., component 113) to draw over a host app (e.g., app 110 and/or app 115) by creating an extra window or GUI element on top of the host app. In Android®, an overlay (e.g., viewOverlay) involves a mobile app drawing a View (e.g., a GUI component) on top of a host View (e.g., the GUI or objects of the underlying app 110/115). In other words, an overlay is an extra layer that sits on top of a host View, which is drawn after all other content in the host View. Interaction with the overlay layer is done by adding and removing drawables. An overlay requested from a ViewGroup is a ViewGroupOverlay. In iOS®, the overlay feature enables an app to create an extra View layer within the same app rather than across apps. In either UI framework, an overlay may be generated in a variety of shapes, areas, and positions/locations within the display region/area (e.g., screen) of the mobile system 105. This is different from the host View which is usually a rectangular shape occupying the full display area of the mobile system 105. Overlays are able to intercept user input that is intended for the underlying host View if certain flags are specified. In summary, an overlay allows one app 110/115 (or component 113) to display a GUI element on top of another app 110/115 or elements of another app 110/115, which can be used to intercept user inputs. In iOS®, an overlay window is a window which can have an arbitrary number of overlay views that sits above the root view of a window; occupy the full size of the screen; and are rotated as appropriate based on device orientation.

An overlay's appearance is defined by the same or similar layout and View parameters used for other Views including position parameters, geometry parameters, background and foreground parameters, gravity parameters (e.g., foregroundGravity), and alpha. For overlays gravity parameters may be used to indicate the placement of an overlay within the larger UI container, and alpha is used to qualify and quantify the transparency of the overlay. As discussed in more detail infra, these and other parameters, including custom Views and customer parameters, may be used to create or draw the distinguishing features for protective measures (or "guards") on or over identified or selected graphical objects (e.g., third part objects and/or third party graphical objects).

The webpages/apps 115 served or otherwise provided by the SPP 120 that are accessed by the client system 105 may be referred to as "first party resources 115" or "FPRs 115," and content served by the SPP 120, which may be embedded or otherwise included in the FPRs may be referred to as "first party content" or "FPC." In the example of FIG. 1, objects 115F represent FPC rendered/displayed within the app 110 and is hereinafter referred to as "FPC 115F." The FPRs 115 may include content and/or services sourced from, and served by a third party entity such as TPP 125. The TPP 125 may serve or otherwise provide content (e.g., text, audio, video, and/or animations) to the client system 105 through webpages or applications provided by the SPP 120. The content served by the TPP 125 via the FPRs 115 may be referred to as "third party content" or "TPC," and the resources linked to, or otherwise referenced by the TPC may be referred to as "third party resources" or "TPRs." In the example of FIG. 1, objects 115T represent TPC rendered/displayed within the app 110 and is hereinafter referred to as "TPC 115T." TPC 115T and/or TPRs may be hosted by the TPP 125 or some other service provider or platform.

In some cases, some portions or regions of the FPR 115 may be reserved for rendering and displaying the TPC 115T. The regions or portions of FPRs 115 that render and display TPC 115T may be referred to as "TPC slots," "ad slots," or the like. In many cases, some code or script is included in website/webpage source documents or application source code, which may include API calls that send requests to the TPP 125 when the FPR 115 is accessed by a client system 105, which then returns the TPC 115T to be rendered/displayed in the FPR 115. The TPP 125 may include one or more application servers that host one or more applications that determine the type of TPC 115T to be provided to the SPP 120, track various user interactions (UIAs) with the TPC, and/or perform other like functions. Usually, the website provider or app developer (e.g., SPP 120) is paid for including this code/script in their source code and showing the TPC 115T in their FPRs.

In various embodiments, TPP 125 is an advertising ("ad") network comprising one or more ad servers that serve ad content. An ad server is a type of advertising technology (AdTech) that is used by publishers, advertisers, ad agencies, and ad networks to manage and run online advertising campaigns. Ad servers include mechanisms to determine particular ad content to show on different FPRs 115 (such as those provided by SPP 120), and serve the ad content to end users (e.g., a user of client system 105) via the FPRs 115. The ad servers may include mechanisms to manage serving different ads to different websites/platforms based on various end-user targeting criteria, pacing criteria, and/or other like criteria/parameters. The ad content may include, for example, banner ads, pop-up ads, email ads, video, audio, animations, and/or other like content. The regions or portions of webpages/applications that render and display ads are often referred to as "ad slots," "ad frames," or the like. Additionally, the ad servers also collect and report data pertaining to interactions with the advertising content (e.g., impressions, clicks, cursor/mouse tracking, etc.) for advertisers to gain insights from and monitor the performance of their ads.

As an example, in order to serve TPC 115T (e.g., ads) to an end-user (e.g., client system 105), the SPP 120 (or web server) returns source code documents (e.g., HTML or the like) in response to a request (e.g., an HTTP request) from the client system 105. The app 110 obtains the source code documents and begins rendering a FPR 115 for display. As the FPR 115 is being rendered, another request is sent to the TPP 125 for TPC 115T to be rendered and displayed within one or more TPC slots within the FPR 115. The TPP 125 selects appropriate TPC 115T to be served to the client system 105 based on information obtained about the client system 105 and/or the user of the client system 105 such as demographic information, system information, UIA data, and/or the like. Various web tracking mechanisms may be used to obtain this information such as the various web tracking techniques discussed herein. The TPP 125 sends third party source code document(s) to the client system 105. The third party source code document(s) include code, scripts, markup, etc., that is/are inserted into the TPC slot in the FPR 115, and contains URLs, pointers, or other like references to the selected TPC, which is hosted by the TPP 125 or another service or platform (e.g., an advertiser platform where the TPP 125 is an ad network or the like). The third party source code document(s), when rendered/executed by the app 110, sends a request for the TPC 115T to the TPC 115T host (e.g., the TPP 125 or other service/platform). In response, the TPC 115T host sends the TPC 115T to the client system 105 via the SPP 120, which is then rendered and displayed by the app 110. The TPP 125 and/or other service/platform may also count an impression or collect other information in response to receipt of the request for the TPC 115T or when the TPC 115T is actually rendered/displayed by the app 110.

Network 101 comprises computers, network connections among various computers (e.g., between the client system 105, verification service 140, and SPP 120), and software routines to enable communication between the computers over respective network connections. In this regard, the network 101 comprises one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 101 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 101 may require that the computers execute software routines which enable, for example, the seven layers of the OSI model of computer networking or equivalent in a wireless (or cellular) phone network. The network 101 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the network 101 may be associated with network operator who owns or controls equipment and other elements necessary to provide network-related services, such as one or more base stations or access points, one or more servers for routing digital data or telephone calls (e.g., a core network or backbone network), etc. Other networks can be used instead of or in addition to the Internet, such as an intranet, an extranet, a virtual private network (VPN), an enterprise network, a non-TCP/IP based network, any LAN or WAN or the like.

The verification service 140 includes one or more verification servers 145, a TP database (DB) 150 and a rules DB 160. The DBs 150-160 may be stored in one or more data storage devices or storage systems that act as a repository for persistently storing and managing collections of data according to a predefined database structure. The data storage devices/systems may include one or more primary storage devices, secondary storage devices, tertiary storage devices, non-linear storage devices, and/or other like data storage devices. In some implementations, at least some of the verification servers 145 may implement a suitable database management system (DMS) to execute storage and retrieval of information against various database object(s). The DMS may include a relational database management system (RDBMS), an object database management system (ODBMS), a non-relational database management system, and/or the equivalent. The DBs 150-160 can be implemented as part of a single database, a distributed database, a collection of distributed databases, a database with redundant online or offline backups or other redundancies, etc., and can include a distributed database or storage network. The verification server(s) 145 may utilize a suitable query language to store and retrieve information in/from the DBs 150-160, such as Structure Query Language (SQL), object query language (OQL), non-first normal form query language (N1QL), XQuery, and/or the like. Suitable implementations for the database systems and storage devices are known or commercially available, and are readily implemented by persons having ordinary skill in the art.

The TP DB 150 may store data associated with third party (TP) resources, including information pertaining to TPC 115T served by the TPP 125 and other TPPs that points/links to the TPRs. For example, the TP DB 150 may include a record for each TPP and fields, such as those shown by table 1.

TABLE 1

| TP DB field types | Description |
| --- | --- |
| Date Added | Date when a TPR is added to the TP DB |
| Resource Type | Type of resource of the TPR, examples: ad and/or ad type, desktop application, preferred executable format (PEF), web application, mobile app., plug-in, browser extension, bundler, zip file, and document (and format). |
| Status | Indicates whether the TPR is active or inactive |
| TPR Name | Name of the TPR (if any) |
| TP Entity/TPP | Entity or organization providing or publishing the TPR |
| Version | Version number of the TPR (if applicable) |
| Entity Contacted | Indicates whether the TP entity has been notified of the TPR being listed in the TP DB; value may be Boolean or a date of contact |
| Fixed | Indicates whether the deceptive behavior of the TPR has been remediated |
| Violations | Lists deceptive or misleading behaviors of the TPR (if any) (e.g., mimicking graphical elements); reasons for being included in the TP DB |
| TPR Sources | Indicates the address or URL of the TPR including, e.g., methods used to detect the TPR, landing page URI, download URI(s), etc. |
| Deceptive Behavior Metadata | Indicates metadata associated with the TPR, such as portable execution (PE) information, anti-virus (AV) detection information, "malvertising" information, etc. |
| Resource Metadata | Indicates time and/or date of current and previous evaluations of the TPR, first version deemed deceptive, target OS, target user/customer, registered advertising networks, return policy, whether the TPR is monetized, etc. |
| Certification Requirements | Indicates potential requirements for the TPR to be removed from the TP DB and/or become a certified TPR |
| Deceptiveness rank or score | A value indicating the potential deceptiveness of the resource |
| User Tacking Technique(s) | Indicates detected user tracking technique(s) (if any), e.g., cookies, web tokens (e.g., JSON web tokens), URL querying strings, web/browser caching techniques, browser fingerprinting, web beacons of pixel tags, cursor tracking script or plugins, session replay scripts/plugins, IP address tracking, etc. |

The deceptiveness rank or score in table 1 is some value, which may be a number or some other expression, that conveys the misleading, deceptiveness, or maliciousness of a TPR as determined by the verification service 140. The deceptiveness rank/score may be based on the number of rules (which are stored in the rules DB 160) that a given resource violates. For example, a first resource that violates more of these rules than a second resource would have a greater deceptiveness rank/score. Any suitable algorithm may be used to calculate the deceptiveness rank/score, and such algorithms may be chosen based on design choice or empirical analyses.

In addition to data listed by table 1, the TP DB 150 may also store relevant content associated with each TPR. For example, the TP DB 150 may store screenshot images of different aspects of the TPR, such as an image of a TPC 115T pointing to the TPR, a video recording (or screenshot or video frame(s)) of the TPC 115T if the TPC 115T is video or animation content, audio recordings if the TPC 115T includes audio content, captured videos of various interactions with the TPR, screenshots of landing pages of the TPR, or the like.

Additionally or alternatively, the TP DB 150 may store user experience data (UXD) gathered from multiple client systems 105. The collected UXD may include or indicate the various types of controls (GCEs) are included in various GUIs, the position of the GCEs within the GUI, graphical characteristics of the GCEs and/or other graphical objects in the GUIs (e.g., size, shape, color, static/animated, etc.), when and how the GCEs are generated and rendered in the GUI, the context of a current session, screenshots of the GUIs, selected GCEs and/or graphical objects (e.g., links) for particular apps 110/115 and/or GUIs, the number of times particular GCEs and/or graphical objects are selected within a particular app 110/115 and/or GUI, the resources accessed from a current resource (e.g., links selected on a particular webpage or the like and the graphical representation of the links), the number of times individual resources are accessed from a current resource, the amount of time spent at individual accessed resource (e.g., how often and how much time elapses before the user navigates back to a previous resource), the position (e.g., coordinates) of inputs (e.g., taps) on the touch-based interface, and/or other like information/data. The other device data/information may also be collected as part of the UXD or separately from the UXD including, for example, location data, other apps running on the devices, and/or other like context and/or system information. The UXD (and/or other collected data) is used by the verification service 140 and/or component 113 to determine the distinction effect types, distinction factors, and/or protection measures (guards) to be applied to a particular GUI or app 110/115.

As discussed in more detail infra, the component 113 may be implemented using an accessibility interface such as Android® Accessibility Services. An accessibility service may register to observe the interactive windows and/or views on a primary display. The primary display includes windows and/or views that have an input focus and/or can be touched by a user. Accessibility services are capable of overlaying a window or other GUI element to intercept UIAs (e.g., taps, gestures, button presses, etc.), and can introspect and perform an action on the windows that are on the screen based on the intercepted UIAs. In embodiments, the accessibility service or accessibility layer determines the location of the window (or portion of the window) and places a "guard" or protective measure on the screen above a windows or portion of the window that displays some identified graphical object, such as a TPC slot or ad slot. The protective measure or guard may be an overlay window that intercepts UIAs to prevent the UIAs from going through to the underlying window. The overlaid guard may include a distinguishing feature to indicate the existence of the guard. For example, the guard may have a blur factor that obfuscates the content underneath the guard. Other distinguishing features may be used in other embodiments.

In these embodiments, the component 113 may be a defined AccessibilityService (or extend an existing AccessibilityService class and implement its abstract methods) that runs in the background and receives callbacks by the client system 105 when AccessibilityEvents are fired. AccessibilityEvents denote some state transition in the UI, for example, when the user changes a focus of the GUI, a GCE has been selected, etc. The AccessibilityService can also request the capability for querying the content of an active window and/or active GUI instance. In these ways, the component 113 and/or the verification service 140 has access to what individual users see on their devices 105, and the data structures behind the interactions with the GUIs. In these implementations, the collected AccessibilityEvents and content of the active window/GUI instance may be the UXD mentioned previously. Additionally or alternatively, the AccessibilityService may include one or more onAccessibilityEvent( ) methods, each of which are called when an AccessibilityEvent matches event filtering parameters specified by the AccessibilityService. The onAccessibilityEvent( ) object provides details about the event(s), including the type of object being acted upon, its descriptive text, and other details. When the event filtering parameters are matched, the system 105 calls the corresponding onAccessibilityEvent( ) method to pass the associated AccessibilityEvent to the AccessibilityService. Usually, the AccessibilityService interprets the passed AccessibilityEvent and provides feedback to the user. In embodiments, the passed AccessibilityEvent or the feedback meant for the user may be passed to the verification service 140 for storage in the TP DB 150 and/or machine learning training. In some implementations, the onInterrupt( ) may be used to reroute the AccessibilityEvent or feedback to the verification service 140. Additionally or alternatively, the AccessibilityService can listen for specific gestures, receive notification of accessibility gestures through the onGesture( ) callback method, and can respond by taking actions for the user. In embodiments, the accessibility gesture notifications can be included as UXD sent to the verification service 140 for storage in the TP DB 150 and/or machine learning training.

In some embodiments, the verification service 140 includes a rules DB 160. In various embodiments, the rules DB 160 stores set of constraints and/or standards that are used to identify TPRs and/or TPC 115T, and to separate the TPRs/TPC 115T from the FPRs/FPC 115F for application of the distinction effects to the TPRs/TPC 115T. The rules DB 160 may optionally store any set of constraints and/or standards for evaluating the deceptiveness of TPC 115T or TPRs. In these embodiments, the rules may be generated based on statutes, regulations, standards, etc. promulgated by governmental agencies or regulatory bodies, standards bodies (e.g., Anti-Malware Testing Standards Organization (AMTSO), W3C Beacon API, etc.). Additionally, the rules DB 160 stores requirements or standards used to determine whether a TPR is misleading or deceptive, such as whether TPC 115T mimics graphical elements of the FPR 115; whether a TPC 115T includes deceptive or misleading information; whether a position or orientation of TPC 115T within a webpage/app 115 is tends to trick users into selecting the TPC 115T; whether a TPR attempts to deceive or mislead users to take any action that was previously declined or cancelled; and/or the like. Additionally or alternatively, the rules DB 160 may store rules for determining when to apply a protective measure to a particular app 115 or resource. These rules can be coded and provided to the component 113 to make decisions on whether to apply a guard, a distinction effect, and/or the amount of distinction factor to be applied, depending on the content/apps 115 being displayed by the client system 105. Additionally or alternatively, the rules DB 160 may store machine learning (ML) models generated to predict malicious, misleading, or inaccessible apps 115 and/or TPCs 115T. In embodiments, the ML models may be generated by one or more verification servers 145, which are then used by one or more same or different verification servers 145 to make predictions.

In various embodiments, the verification servers 145 may operate detection mechanisms to identify potentially misleading or malicious TPCs 115T within a webpage/app 115, and/or identify potential operational/accessibility issues with a particular GUI. As an example, one or more verification servers 145 may operate one or more heuristic analysis engines (or heuristic engines) to scan resources and/or applications 110/115 for malicious and/or deceptive code. The heuristic engine(s) may execute the potentially malicious or deceptive script or code within a specialized VM and observe its operation in isolation from other components of the client system 105 and/or the servers 145. Additionally or alternatively, the heuristic engine(s) may decompile the script or code to analyze the underlying machine code for suspicious code blocks/snippets. In either case, the heuristic engine(s) may be individual ML models that are trained using UXD collected from various client systems 105.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models," "models," or the like) based on sample data (referred to as "training data," "model training information," or the like) in order to make predictions, inferences, or decisions. Generally, an ML algorithm is a computer program that learns from experience with respect to some task and some performance measure, and an ML model is any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. ML algorithms may build or develop ML models using supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. After the model is trained on some training data, the model can be used to process additional data to make predictions. In various embodiments, the components 113 of respective client systems 105 gather UXD about the currently displayed GUIs, which is then used as training data for generating the ML models. The training may be supervised or unsupervised training depending on the particular ML algorithm used. The ML models are then used by the component 113 to decide when and what type of distinction effects and/or guards to be applied to a particular GUI or graphical objects. After the ML models are trained, the ML models may be provided to the components 113 to determine when to apply a distinction effects and/or protective measures. For example, the component 113 may collect or identify parameters of a currently running app 110/115 (including UXD, TPR indicators, and the like), use those parameters as inputs to the ML model, and obtain outputs indicating the type of protective measure to use, the distinguishing effect of to be applied to the protective measure, and the like.

In some implementations, the ML model may be a neural network (NN) that includes an input layer, one or more hidden layers, and an output layer. The input layer receives data of various input variables (or "features"), the hidden layer(s) processes the inputs, and the output layer outputs the determinations or assessments (e.g., "output variables"). In one example, the input variables of the NN are set as a vector containing the relevant variable data, and the output determinations or assessments of the NN are also as respective vectors. The input variables may be restricted to a limited set of quantifiable properties, which are referred to as "features." In the context of ML, a feature is an individual measureable property or characteristic of a phenomenon being observed. Features are usually represented using numbers/numerals (e.g., integers), strings, variables, ordinals, real-values, categories, Boolean values, and/or the like. A set of features may be referred to as a "feature vector." A vector is a tuple of one or more values called scalars, and a feature vector may include a tuple of one or more features. In various embodiments, the ML model (as operated by the component 113 and/or the verification service 140) accepts UXD as the input variables, and the output variables include determined TPRs/deceptors, distinction effects, distinction factors, and/or protection measures to be applied to a GUI to be rendered and displayed. Additionally, the network variables of the hidden layer(s) for the NN, are determined by the training data. As examples, the NN may be a feed-forward NN (FNN), deep NN, deep FNN (DFN), convolution NN (CNN), deep CNN (DCN), deconvolutional NN (DNN), a deep belief NN, a perception NN, recurrent NN (RNN) such as a Long Short Term Memory (LSTM) algorithm and/or gated recurrent units (GRUs), and/or the like. In other embodiments, other ML techniques may be used such as deep learning matrix factorization algorithms, Markov chains, Bayesian Networks (BN), dynamic BNs (DBNs), Bayesian classifiers, Linear Dynamical Systems (LDS), Switching LDS (SLDS), k-nearest neighbor (kNN), logistic regression, decision trees, random forests, support vector machines (SVMs), among many others.

In various embodiments, the verification servers 145 may train and operate ML models to perform the TPR detection and train and operate ML models to determine the distinctions/guard parameters for individual client systems 105 and/or apps 115/110. The verification servers 145 train the ML models for TPR detection and determining the distinctions/guard parameters, and components 113 of respective client systems 105 operate the ML models to detect TPRs and determine distinctions/guard parameters for apps 110/115. This allows the component 113 to protect the user of a client system 105 from inadvertently activating/launching TPRs (or deceptors) associated with identified TPCs 115T. This also allows the component 113 to make the decisions locally without sending consumer personally identifying information (PII) to the verification service 140.

The heuristic engines, ML algorithms (e.g., model trainers), and/or ML models may be implemented as individual VMs and/or containerized applications. In these implementations, each heuristic engine, ML algorithm (e.g., model trainer), and/or ML model may be run in a respective VM and/or respective container (which may be run within one or more VMs). The VMs or containers may be spun up using a VM image or container image, respectively, which contain the necessary ML models to be operated, and/or training libraries that the model uses to run the training algorithm and the training data set(s) on which to train. A suitable VM orchestration engine/technology and/or a container engine may be used to spin up the VMs or containers. VM/container engines are software engines, modules, or other like collection of functionality that provide cluster management and VM/container orchestration services to run and manage VMs and/or containers (e.g., Kubernetes® containers, Docker® containers, and the like). The VM and/or container engine may be or include virtualization infrastructure, IaaS clouds, and/or VM/Cloud orchestration technology such as OpenStack™, Apache® Cloudstack, OpenNebula, vRealize Orchestrator service provided by VMWare®, Google® Compute Engine services, Elastic Compute Cloud® (E2C®) provided by Amazon.com, Inc., and/or the like. Additionally or alternatively, the VMs or containers may be implemented and/or deployed using a suitable container engine, such as Google® Container Engine service (also known as Google® Kubernetes Engine or "GKE"), Oracle® Container Engine for Kubernetes™, Docker® Engine, Container Runtime Interface using the Open Container Initiative runtime (CRI-O), Linux Containers or "LXD" container engine, rkt (pronounced like a "rocket"), Railcar, and/or the like.

As alluded to previously, the client system 105 is configured to run, execute, or otherwise operate app 110. The app 110 is a software application designed to generate and render objects 115, which include various types of content such as FPC and TPC. At least some of the objects 115 include GUIs and GCEs that enable interactions with the SPP 120, TPP 125, and/or verification service 140. Additionally, the app 110 may include one or more components, such as verification component 113, to perform specific functions. The verification component 113 is a software component configured to detect TPRs sourced or served by a third party entity (e.g., the TPP 125 or some other platform/service), and alter the rendered objects 115T to distinguish the TPC 115T from the FPC according to the embodiments discussed herein. The TPC 115T may be distinguished based on whether the TPC 115T is misleading or deceptive, while in other embodiments the TPC 115T is distinguished regardless of whether the TPC 115T is misleading/deceptive or not. The app 110 and the verification component 113 may be developed using any suitable programming languages and/or development tools, such as those discussed herein or others known in the art.

In various embodiments, the app 110 and/or component 113 are operable or configurable to detect touch gestures. A "touch gesture" occurs when a user places one or more fingers or the tip of a stylus on a touch interface in a particular pattern, and the pattern of touches is then interpreted as a particular gesture. For purposes of the present disclosure, the terms "touch," "tap," "gesture," "touch gesture," and the like may be used interchangeably and may refer to finger-based touches/gestures or stylus-based touches/gestures. Gesture detection involves detecting touch events (or gathering data about touch events, and interpreting the touch events (or data about touch events) as a particular motion or gesture. A gesture starts when a user first touches the touch interface, ends when the user's fingers leave the touch interface, and includes various touches/interactions between the first touch and the fingers being lifted off the touch interface. Each interaction is tracked by the system 105 (e.g., by the underlying OS or the like). Here, each interaction includes information such as the number of fingers touching the touch interface, the position of the user's finger(s) on the touch interface, the force of the touch, the velocity of the motion (e.g., in terms of pixels per second along an x and y-axis), and the like. Each interaction is interpreted as an event (e.g., a MotionEvent), and a gesture ends when the final event of the user's fingers leaving the touch interface is captured. The combination of events is provided to the app 110/113 in some format that allows the app 110/113 to determine if the gesture should be used to manipulate or otherwise change the GUI. The OS operating on the client system 105 may provide libraries, APIs, or the like for interpreting the gestures. Examples of gestures may include single or multiple taps, long-press (or hold), panning (dragging) including panning start near an edge of the touch interface, pinching, rotation involving one or two touches, swiping in one or more directions, flinging, hovering/pointer movement over a view, and the like.

The objects 115 may represent a web application that runs inside the app 110. For example, the app 110 may be an HTTP client, such as a "web browser" (or simply a "browser") for sending and receiving HTTP messages to and from a web server of the system 120. In this example, the verification component 113 is a browser extension or plug-in configured to allow the app 110 to render objects 115 with distinguishing effects (or distinctions) to TPC 115T. Example browsers include WebKit-based browsers, Microsoft's Internet Explorer browser, Microsoft's Edge browser, Apple's Safari, Google's Chrome, Opera's browser, Mozilla's Firefox browser, and/or the like. In another example, the app 110 may be a desktop or mobile (e.g., stand-alone) application that runs directly on the client system 105 without a browser, and communicates (sends and receives) suitable messages with the SPP 120.

The app 110 is a messaging application and the objects 115 may represent individual messages (e.g., instant messages, SMS/MMS messages, and/or the like) inside the app 110. Examples of such messaging applications may include Facebook Messenger® and WhatsApp® provided by Facebook, Inc., direct messaging functionality of social networks such as Twitter® and Instagram®, WeChat® and QQ Messenger® provided by Tencent Holdings Limited, Viber® provided by Rakuten, Inc., Line® provided by Line Corp. (a subsidiary of Naver Corp.), Snapchat® provided by Snapchat, Inc., KakaoTalk® provided by Kakao Corp., Google Hangouts® provided by Google, Inc., BBM® provided by Blackberry, Ltd. and/or PT Elang Mahkota Teknologi Tbk (commonly known as Emtek), Slack® provided by Slack Technologies, Inc., Signal® provided by Signal Foundation and/or Signal Messenger LLC, Telegram® provided by Telegram FZ LLC and/or Telegram Messenger, Inc., and Zalo® provided by VNG Corp., and/or the like. In either of these examples and embodiments, the verification component 113 may be a separate application that communicates with the app 110 via a suitable API, middleware, software glue, etc., or the verification component 113 is a plug-in configured to allow the app 110 to render objects 115 with distinguishing effects to TPC 115T. When implemented as stand-alone applications, the app 110 and/or the verification component 113 may operate within respective security sandboxes, virtual machines (VMs), containers, wrappers, or some other means for isolating the app 110 code and/or the verification component 113 code to run in isolation from other applications. One or more data containers may also be created within the sandbox, VM, container, wrapper, etc.

The app 110 may be platform-specific, such as when the client system 105 is implemented as a mobile device, such as a smartphone, tablet computer, or the like. In these embodiments, the app 110 may be a mobile web browser, a native (mobile) application specifically tailored to operate on the mobile client system 105, or a hybrid application wherein objects 115 (or a web application) is embedded inside the native (mobile) application 110. In some implementations, the app 110 and/or the web applications that run inside the app 110 is/are specifically designed to interact with server-side applications implemented by the application platform of the provider system (discussed infra). In some implementations, the app 110, and/or the web applications that run inside the app 110, may be platform-specific or developed to operate on a particular type of client system 105 or a particular (hardware and/or software) client system 105 configuration. The term "platform-specific" may refer to the platform implemented by the client system 105, the platform implemented by the system 120, and/or a platform of a third party system/platform.

In the aforementioned embodiments, the client system 105 implementing the app 110 is capable of controlling its communications interface(s) to send and receive HTTP messages to/from the SPP 120 and/or verification service 140, render the aforementioned objects 115 in the app 110, request connections with other devices, and/or perform (or request performance) of other like functions. The header of these HTTP messages include various operating parameters and the body of the HTTP messages include program code or source code documents (e.g., HTML, XML, JSON, or some other like object(s)/document(s)) to be executed and rendered in the app 110. The app 110 executes the program code or source code documents and renders the objects 115 (or web applications) inside the app 110.

The rendered objects 115 (or executed web application) allows the user of the client system 105 to view content provided by the SPP 120, which may include the results of a requested service, visual representations of data, hyperlinks or links to other resources, and/or the like. The rendered objects 115 also include interfaces for interacting with the SPP 120, for example, to request additional content or services from the SPP 120. In an example, the rendered objects 115 may include a graphical GUIs, which are used to manage the interactions between the user of the client system 105 and the SPP 120. The GUIs comprise one or more graphical control elements (GCEs) (or widgets) such as buttons, sliders, text boxes, tabs, dashboards, etc. The user of the client system 105 may select or otherwise interact with one or more of the GCEs (e.g., by performing a touch gesture for touch interface systems) to request content or services from the SPP 120.

The rendered and displayed objects 115 may include links to other resources from one or multiple sources, some of which may be TPRs. Some of these TPRs may be misleading, deceptive, or malicious resources, each of which may be in the form of webpages or websites, web apps, executable code, scripts, active content, cloned websites, and/or the like. A "misleading resource" is a resource, application, or service that uses misleading tactics in order to lure users to access or visit those resources. Examples of misleading resources may include a website or platform that use trick banners on other websites/platforms to driver traffic to their website/platform. A "deceptive resource" or "deceptor" is a resource, application, or service that exhibits deceptive behaviors or practices that may potentially harm users or consumers. A malicious resource (or "malware") is a resource that is intentionally designed to cause damage to a computer system or computer network. Examples of deceptors and/or malware may include adware, scareware, spyware, cloned websites, and the like. Some resources may be categorized as any combination of misleading, deceptive, and malicious, and as such, these terms may be used interchangeably throughout the present disclosure. However, most TPRs do not harm users or their devices, but instead attempt to lure or trick users into accessing third party content for advertising purposes or otherwise increase their revenue.

In one example, the SPP 120 is a search engine service, the app 110 is a browser, and the SPP 120 provides the client system 105 with a search engine results page (SERP) 115 in response to a submitted a search query, where the SERP 115 may include multiple links to other websites and advertising content 115T served by TPP 125. In this example, the ad content 115T in the SERP 115 may reference a respective TPR, which when selected by a user of the client system 105, may lead to the referenced TPR. In another example, the provider service 120 may be a social networking platform, and the app 110 may be a native (mobile) application 115 that allows a user of the client system 105 to interact with the social networking platform. In this example, the objects 115 rendered by the app 110 may include direct messages or emails that include links to TPRs, as well as a news feed GUI, timeline GUI, or other like stream of information updates. The news feed or timeline GUI may include user-generated content and/or TPC linking to various TPRs, some of which may be ad content linking to advertiser resources (e.g., "sponsored stories," "sponsored updates," "boosted posts," "promoted tweets," etc.). In any of the aforementioned examples, the ad content 115T/TPRs may be identified from among the FPRs/FPC 115F, and distinguishing effects may be applied to the ad content 115T/TPRs according to the embodiments discussed infra.

Malicious resources often attempt to lure users into accessing malicious resources, downloading and installing malware onto their client systems 105, automatically execute malicious program code or scripts, display a content item that carriers a malware payload and executes when the user opens or interacts with the content, and/or lure users into submitting their personal or financial information by posing as legitimate platforms. Deceptive resources, on the other hand, often attempt to lure users into accessing deceptive resources, and/or may simply display deceptive content. In these scenarios, it can be difficult for users to discern malicious or deceptive resources from legitimate (trustworthy) resources since malicious and deceptive resources are often designed to look legitimate. For example, some deceptors are designed as anti-virus or anti-malware applications that fail to indicate unfavorable subscription terms and fees. Furthermore, some users inadvertently navigate to misleading and/or deceptive resources based on human error (e.g., accidently clicking on a link to a deceptive resource) and/or based on UI errors (e.g., a poorly calibrated touchscreen).

In order to better detect misleading, deceptive, and/or malicious resources or any TPRs included in FPRs or FPC 115F, the embodiments discussed herein improve upon previous GUIs by dynamically detecting TPRs/TPC 115T in obtained web documents and distinguish the TPRs/TPC from among other displayed content such that the TPRs/TPC 115T become automatically highlighted, accentuated, obscured, concealed, veiled, or otherwise distinguishable from FPC 115F to the user. The TPRs may include links or references to TPRs (e.g., third party websites or TPP 125), or TPC 115T (e.g., text, images, video, etc. that is misleading, deceptive, or malicious) to be rendered within a first party webpage/app or along with FPC 115F in the app 110. In particular, when the app 110 obtains a web document, the verification component 113 identifies TPRs in the source code of the web documents, and distinguishes the TPRs 115 from the FPR and/or FPC 115F by altering the behavior of the rendered objects 115T in the app 110. The behavior of the rendered objects 115T is only altered when a TPR/TPC 115T is detected in the source code so that the TPR/TPC 115T is distinguishable from the user's point of view. In this way, the user of a client system 105 may distinguish between FPC 115F and TPC 115T displayed in a webpage/app 115 so as to not mistakenly access TPRs and/or unintentionally break or disable the webpage/app 115.

In other cases, TPCs may not be malicious or misleading, but are still susceptible to inadvertent selections (e.g., taps) due to poor user experience and/or user interaction (UX/ UIA) design, user error, and/or user disabilities (e.g., vision and/or dexterity impairment). For example, an app 115 GUI may include a pop-up ad or some other type of advertisement, which may include a close GCE (e.g., usually depicted as an "X" within a circle or square in most GUI ads). Where the client system 105 has a touch interface, a user may attempt to close the pop-up ad by selecting the close GCE, but ends up tapping or touching a region of the pop-up ad that is about one millimeter to the side of the close GCE. This causes a the third party graphical object (TPGO) link to an associated TPR to be activated, which causes the browser 110 to navigate to the TPR, or causes the mobile device 105 to launch some other mobile application, such as an app store application, web browser, or the like. In some cases, these mobile-based ads are designed to mislead the user, for example, by creating a fake close GCE or the like within the ad. In any of the aforementioned examples, the ad content 115T/TPRs may be identified from among the FPRs/FPC 115F, and protective measures may be applied to each of the identified ad content items 115T. In these embodiments, the protective measures may prevent the user from selecting/ activating the TPRs until a predefined gesture is performed to remove individual protective measures. Additionally or alternatively, distinguishing effects may be applied to the protective measures according to the embodiments discussed infra.

As mentioned previously, the embodiments provide that the user may remove the protective measures from a TPRs/ TPCs 115T by performing a gesture over the distinguished region. When distinguishing features are applied to the protective measures, when the user performs a desired gesture on the protected region of the application 110, the TPR is returned to its original form or format so as to be viewable by the user. In this way, the user can easily identify the details of the TPR/TPC 115T within the app 110 without inadvertently launching the third party link, which reduces computational complexity and overhead. In these ways, instead of blocking access to the TPRs and/or disabling functionality of the webpage/app 115 (which may go against the user's wishes), the app 110 and/or the verification component 113 injects protective measures and/or visual distinction indicators onto the TPR or TPC 115T.

Moreover, in some embodiments, the verification service 140 may rank the misleading, ambiguous, or deceptive behavior of different resources, and may assign a rank or grade to each resource. In these embodiments, the verification service 140 may provide the rank or a suitable scaling factor, which influences the amount of distinction (e.g., accent, obfuscation, illumination, etc.) to be applied to an individual TPR. In particular, when the verification component 113 identifies TPRs in a web document's source code, and the app 110 or verification component 113 increases or decreases the distinction applied to the TPRs according to their respective misleading/deceptiveness ranks. In this way, the user can easily judge the misleading nature or deceptiveness of individual objects 115 within the app 110.

In embodiments, the elements of arrangement 100 may operate as follows: Some or all of the verification servers 145 in the verification service 140 operate web scrapping algorithms to extract data from various websites, and operate data mining algorithms to identify TPRs from the extracted data. The data mining algorithms may utilize the rules stored in the rules DB 160 in order to determine whether a resource should be considered to be misleading, deceptive, and/or malicious. Once the resources are determined to be misleading, deceptive, and/or malicious, the verification servers 145 may control storage of the resources (or resource IDs) and/or associated data (see e.g., table 1 supra) in the TP DB 150. This process may operate on a periodic basis to identify new TPRs, and the verification servers 145 may re-evaluate the degree to which the previously identified resources are misleading, deceptive, and/or malicious. These processes may be omitted in embodiments that do not identify or rank resource behaviors.

Subsequent or concurrent with (or regardless of) the web scrapping and data mining processes, the client system 105 submits a resource request (e.g., a search query, a webpage URL, etc.) through the app 110, which is sent in an appropriate message (e.g., an HTTP message). In response, the provider service 120 sends an appropriate response message including source code of the requested resource (e.g., a SERP, a source code documents for a landing page of the requested URL, etc.). Prior to, during, or after the app 110 executes the source code and renders objects 115, the verification component 113 analyzes the source code for any TPRs in consultation with the verification service 140. For example, where the source code includes HTML, the component 113 may search for hyperlink reference attributes ("href") within respective anchor tags ("<a>") and extract the value of the hyperlink reference attributes.

In another example, the verification component 113 may use a locator strategy to analyze the source code for particular elements, such as GUI components that host/serve TPC/TPGOs and/or referenced TPRs. In order to find elements in a mobile environment (e.g., where client system 105 is a mobile device), the locator strategy may be specific to, or adapted for, the particulars aspects of the mobile environment.

Example locator strategies include xpath, id, class name, and accessibility id. The xpath locator strategy exposes the functionality of XPath language to locate elements within a mobile view. The xpath is an abstract representation of a path to an element, with certain constraints. In other words, the xpath is a valid XPath string applied to one or more XML documents that is to be retrieved using the page source command. The id is a string corresponding to a native element identifier (e.g., resource-id or android:id for Android, and name for iOS). The class name strategy is a string representing the UI element type for a given platform (e.g., NAPickerWheel for iOS® or androidwidget.Button for Android®). These should exactly match the class names given by the underlying automation frameworks. For iOS, the class name is the full name of the UIAutomation class, such as UIATextField for a text field. The iOS UIAutomation is a string corresponding to a recursive element search using the iOS UIAutomation library/API. For Android, the class name is the fully qualified name of the Android UIAutomator class, such android.widget.EditText for a text field. The android uiautomator is a string corresponding to a recursive element search using the Android UiAutomator library/API. Additionally or alternatively, a predicate string corresponding to a recursive element search using the iOS Predicate system/library may be used. A predicate (or predicate string) is a logical statement that evaluates to a Boolean value (e.g., true or false), and includes comparison predicates (compares two expressions using an operator and returns the result of invoking the operator with the results of evaluating the expressions) and compound predicates (compares the results of evaluating two or more other predicates, or negates another predicate).

The accessibility id is a string representing the accessibility ID or some other unique identifier or label attached to a given element. The accessibility id locator strategy is designed to read the accessibility ID or other label for a UI element. For iOS, the accessibilityIdentifier is a property (or instance property) that holds the unique ID for an accessibility element. The value of accessibilityIdentifier corresponds to the return value of the name method of UIAElement. For Android, accessibility id is, or maps to, the content description attribute ("content-desc" attribute or "android:contentDescription" XML attribute). For example, where the accessibility id locator strategy is used for an Android app 110, the component 113 may search for content description attributes (e.g., "content-desc" attribute or "android:contentDescription" XML attribute) within the source code and extract the value of the content description attributes. The content description attribute defines text that briefly describes content of a view. The content description attribute allows developers to add textual information to views, which is used primarily by accessibility services to provide a textual representation of views that do not typically have textual representations. In some embodiments, the component 113 applies a protective measure to GUI components 115 having a content-desc or accessibility ID attribute matching (within some margin of error) a GUI component that hosts TPGOs or TPC or an identifier of a TPR (e.g., a URL or portion of a URL). In some embodiments, the component 113 applies a protective measure to GUI components 115 having a view ID matching (within some margin of error) a GUI component known to host TPGOs or TPC. In cases where the locator strategy cannot be used (e.g., where there is no accessibility ID or content-desc attribute for a GUI component identified as TPC), the component 113 may determine the coordinates of the TPC/TPGOs within the GUI, and apply the protective measure on or at those coordinates.

The consultation with the verification service 140 involves the verification component 113 communicating the identified resources with one or more verification servers 145 in the verification service 140. Continuing with the previous example, the verification component 113 may send the values extracted from the hyperlink reference attributes to the verification server(s) 145. The communication between the verification component 113 and the verification server(s) 145 may be done through the app 110 or through separate channel. The verification server(s) 145 obtain the identified resources from the client system 105, and query the TP DB 150 using some or all of the parameters passed from the component 113.

If an identified resource matches an entry in the TP DB 150, the verification server(s) 145 responds to the component 113 with a distinction indicator (also referred to as "TPR indicators" or the like). The distinction indicator is a database object or suitable data structure that includes information (e.g., in appropriate data fields or information elements (IEs)) for distinguishing a graphical object 115T associated with a TPR within a GUI. This information includes or indicates the TPR (e.g., using a resource identifier, URL, or the like) and an intensity of the distinction to be applied to the graphical object 115T of the TPR. The distinction indicator may also indicate a type of distinction to be applied to the graphical object 115T of the TPR, such as highlighting the TPR (with or without a color), shadow effect, contrast, redaction, obfuscation or blurring, illumination, application of a graphic or animation, etc. In these embodiments, the distinction indicator may include or indicate a function to be used for distinguishing the graphical object 115T of the TPR (e.g., a blurring function, redacting function, shadow function, an animation/graphic to apply, and/or some other function such as those discussed herein). In other embodiments, the distinction indicator may indicate or include an index or other identifier that refers to the particular distinction function to be used.

Additionally or alternatively, and as discussed in more detail infra, the distinction indicator may indicate a type of protective measure (guard) to be applied to, or injected on top of, the graphical object 115T of the TPR such as, for example, a scrolling guard, a message guard, or a safe close guard. The guard type may be based on a detected potential problem detected by the app 110 and/or component 113, or as detected by the verification service 140. For example, the component 113 or verification service 140 may detect a web-based ad problem, and may provide a distinction guard to protect the user from mistakenly activating the detected advertisement (e.g., by mis-tapping the TPC 115T) when the user intended to perform a scrolling action or some other action. In another example, the component 113 or verification service 140 may detect a direct link problem, and may provide a message guard to protect the user from mis-tapping suspicious (e.g., potentially malicious or misleading) links in suspicious messages (e.g., emails, SMS/MMS messages, etc.) that include links and the like. These messages may be referred to as "tricky messages." In another example, the component 113 or verification service 140 may detect a close-ad problem, and may provide a safe close guard to protect the user from mis-tapping the detected advertisement/TPC 115T when the user intended to close or exit the ad/TPC 115T or intended to perform some other action. These example scenarios are discussed in more detail infra with respect to FIGS. 2-13.

In some embodiments, the distinction indicator may include the previously discussed rank/score to indicate an intensity value for the distinction. In these embodiments, the component 113 may use the rank/score to calculate an "distinction factor" (also referred to as a "blur factor"), which indicates an amount of distinction to be applied to the identified resource. In some embodiments, the ranking/score increases as the severity of misleading, deceptive, and/or malicious behavior of the resource increases, which allows the distinction factor to increase (or decrease) in relation to that behavior. In other embodiments, the ranking/scores may be calculated using other criteria/parameters such as based on style or other like design attributes of the rendered webpage/app, user or client system 105 preferences/attributes, or the like. The distinction factor may be a scaling factor, such as a multiplier or percentage, that is used to adjust (i.e., increase or decrease) a default amount of distinction. In other embodiments, the verification server(s) 145 may calculate the distinction factor based on the rank/score, and may send the distinction factor with or in the distinction indicator. In these embodiments, the distinction factor may be an intensity value or percentage.

If an identified resource does not match an entry in the TP DB 150, the verification server(s) 145 may respond to the component 113 with a suitable HTTP status code or may not respond to the component 113 at all. In some embodiments, the verification server(s) 145 may provide a rank/score or scaling factor that indicates that no distinction should be applied. For example, the verification server(s) 145 may send a distinction indicator with a value of zero in a ranking/score field/IE or scaling factor field/IE.

As mentioned previously, the component 113 may be implemented as an accessibility service (AccessibilityService) such as Android® Accessibility Services that runs in the background and receives accessibility events (e.g., AccessibilityEvents) from the client system 105. In these implementations, the component 113 may be referred to as "AccessibilityService 113" or the like. An accessibility service (AccessibilityService) is an application that provides UI enhancements to assist users with disabilities or users that are unable to fully interact with a client system 105. The AccessibilityService 113 is able to obtain UXD related to various interactions with the client system 105 (e.g., based on collected AccessibilityEvents, content of an active GUI instance, detected gestures, etc.). Additionally, the AccessibilityService 113 is able to perform actions in response to received AccessibilityEvents (e.g., by retrieving the AccessibilityNodeInfo object from the event using the getSource( ) method).

The AccessibilityService 113 may include an onAccessibilityEvent( ), which is a method that is called back by the client system 105 when it detects an AccessibilityEvent that matches event filtering parameters specified by the AccessibilityService 113. For example, when the user taps on a button or focuses on a GCE in the app 110/115 for which the AccessibilityService 113 is providing feedback, the system 105 and/or app 110/115 passes the associated AccessibilityEvent to the AccessibilityService 113, which then interprets the AccessibilityEvent to provide feedback to the user. In some embodiments, the AccessibilityService 113 may receive an indication of a TPR and/or TPGO as an AccessibilityEvent, and in response, apply a protective measure to the GUI element associated with the AccessibilityEvent. In some embodiments, the AccessibilityService 113 may receive UXD and parameters and/or attributes of an app 110/115 as one or more AccessibilityEvents, determine or identify TPGOs based on the one or more AccessibilityEvents, and in response, apply a same or different protective measures to each of the identified TPGOs.

Additionally or alternatively, the component 113, the app 110, or some other subsystem of the client system 105 may implement a caching mechanism (e.g., a forward position cache system, a client side cache system, or the like) to obtain and store resources and TPR indicators to avoid unnecessary fetching from the SPP 120, TPP 125, and/or the verification service 140 in order to serve existing and/or new user requests more efficiently. In these embodiments, the component 113 and/or the app 110 may store the TPR indicators in association with cached resources and content. For example, if a back button of the app 110 is pressed, the local cached version of a previously visited webpage may be displayed instead of a new request being sent to a web server for that webpage. Additionally, any cached TPR indicators stored in association with the webpage may be accessed and applied to objects 115T of that webpage (e.g., as identified by the app 110 or component 113).

Additionally or alternatively, the verification service 140 may also include or implement a caching mechanism (not shown by FIG. 1) to obtain and store TPR indicators to avoid unnecessary data querying from the TP DB 150 and to serve the distinction indicators to the component 113 more efficiently. This caching mechanism may be implemented by one or more of the verification servers 145 or a separate dedicated caching system, such as a content delivery network (CDN), edge computing system/network, or the like. The caching mechanism may include any suitable system, program code, etc. that, upon receipt, temporarily stores distinction indicators in a local cache. The caching mechanism may include aspects of web caching mechanisms and DB caching mechanisms. A web caching mechanism may temporarily store web objects, and a DB caching mechanism may temporarily store database objects from the DBs 150-155. In some implementations, various components throughout the delivery path to the client system 105 (e.g., intermediate nodes or hops) may also cache distinction indicators to speed up subsequent requests, subject to the caching policies for the resources 315. As an example, the caching mechanism may cache identified resources obtained from component 113 and specific indicators associated with the identified resources according to certain rules, policies, configurations, etc. In cases where the identified resource embeds, references, or otherwise incorporates one or more external resources (e.g., using the source (src) attribute in a script, embed, image (img), audio, and/or video HTML tags; using the relationship (rel) attribute in the anchor (a), link, and/or area HTML tags; using the open( ) method in Ajax or XMLHttpRequest (XHR); using loadStrings, loadJSON, loadXML, loadTable in p5.js of the Processing programming language; using doc.load(xml); and/or the like), the verification server(s) 145 may identify those external resources, and provide TPR indicators of the external resources in a same or similar manner as discussed previously.

In response to receipt of the TPR indicator, the app 110 or component 113 distinguishes a visual representation of the identified resource during or after the objects 115 are rendered in the app 110. When the TPR indicator includes an distinction factor, the component 113 adjusts the amount of distinction to be applied to the visual representation of the identified resource. Additionally or alternatively, in response to receipt of the TPR indicator, the component 113 applies or injects a protective measure (referred to as a "guard") into the GUI at or on the visual representation of the identified resource (e.g., TPGO). In these embodiments, the TPR indicator indicates a type of guard to be added to the GUI and/or the graphical object over which to apply the guard. Additionally or alternatively, the protective measure is itself a UI component/element that accepts user inputs, and the component 113 overlays the protective measure on top of a TPC/TPGO.

In various embodiments, the AccessibilityService 113 may use the AccessibilityWindowInfo class to overlay the protective measure on the identified TPC/TPGOs. The AccessibilityWindowInfo class represents a state snapshot of a window for accessibility purposes. The screen content contains a collection of one or more windows that are hierarchically ordered (e.g., where some windows are descendants of other windows). The AccessibilityWindowInfo class includes TYPE ACCESSIBILITY OVERLAY, which is used to create windows that are overlaid only by an AccessibilityService (e.g., AccessibilityService 113) for interception of UIAs without changing the windows can accessibility service can introspect. The terms "introspect" or "introspection" refer to the ability of a program (e.g., AccessibilityService 113) to examine or determine the type or properties of an object at runtime. In particular, an AccessibilityService can introspect windows that a user can interact with (e.g., windows that a user can touch or type into). For example, if there is a full screen accessibility overlay that is touchable, the windows below it will be introspectable by an AccessibilityService regardless of whether they are covered by a touchable window. In these embodiments, the AccessibilityService 113 generates an overlay on top of the identified TPC/TPGOs, and/or overlays a window on top of the identified TPC/TPGOs. Additionally or alternatively, the AccessibilityService 113 identifies the position and geometric parameters of the identified TPC/TPGOs, and draws the overlay to have a same spatial and geometric parameters as the identified TPC/TPGOs.

In some embodiments, the type of guard to be applied to a GUI element or graphical object (including the distinguishing effect of the guard) is based on the detected potential problem or accessibility issue with a GUI or particular GUI elements or graphical objects. The detected accessibility issues may be based on various parameters, such as the size and shape of the GUI elements or graphical object, a layout or arrangement of GUI elements within a GUI and/or with respect to one another, the type of application 110/115 in which the GUI or graphical objects is/are displayed, the specific application 110/115 displaying the GUI or graphical objects, user demographics (e.g., age, indications of vision or dexterity issues), and/or other parameters. As examples, the accessibility issues may include a direct link problem (e.g., where the component 113 guards links or other GUI elements in messages so users do not mis-tap on the links or other GUI elements), a web scrolling problem (e.g., where the component 113 guards ads or other TPC in a webpage so users do not mis-tap on GUI the ads/TPC when they intend to scroll through the webpage), and a close GUI problem (e.g., where the component 113 guards GUI elements such as pop-up ads so users do not mis-tap on the GUI element when attempting to close or exit the GUI or GUI element). Example GUIs in accordance with these embodiments are shown and described with regard to FIGS. 2-13.

Referring now to FIGS. 2-13, which illustrate example interfaces facilitated by a remote system (e.g., SPP 120, TPP 125, and verification service 140 of FIG. 1) according to various techniques described herein. In particular, each of FIGS. 2-13 illustrate example interfaces that may be displayed on a client system 105 (such as the various GUIs and GCEs discussed previously). The example interfaces of FIGS. 2-13 may be displayed or rendered by the app 110 and/or altered by the component 113. While particular example interfaces are illustrated, in various embodiments, other interfaces may be utilized. FIGS. 2-13 illustrate an example UI where the distinguishing effect includes obfuscating (or blurring) various TPCs 115T, in accordance with various example embodiments. Although the example of FIGS. 2-13 describe the use of obfuscation or blurring to distinguish TPRs from FPRs, in other embodiments, other types of distinguishing effects may be used in a same or similar manner as discussed infra.

Figure 2:
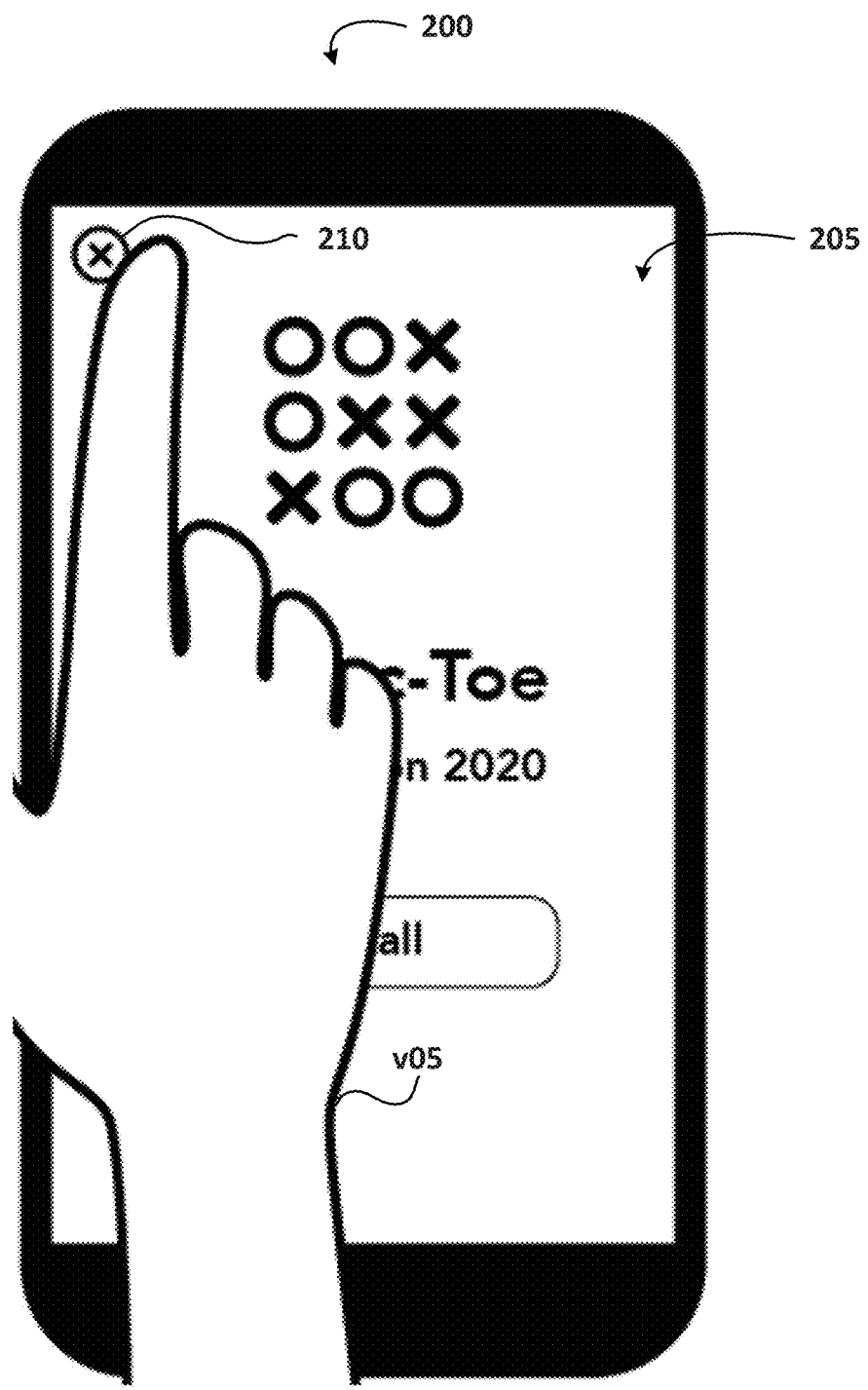
FIGS. 2-13 illustrate example graphical user interfaces in accordance with various embodiments.
Figure 3:

Referring to FIGS. 2-5, which show example GUI instances 200-500, respectively, related to safe-closing scenarios (or close GUI problem). In the example illustrated by FIGS. 2-5, the app 115 is a native or hybrid mobile app or mobile-optimized web app rendered in a mobile browser 110. In the example of FIG. 2, the GUI instance 200 displays a graphical object 205, which is third party content (TPC) 115T or a Third Party Graphical Object (TPGO). The graphical object 205 is a link or reference to a target TPR 305, which is shown by FIG. 3 (the GUI instance 200 and/or the graphical object 205 being the source object in this example). When the user v05 activates the TPGO/link (e.g., by tapping on the graphical object 205), the browser 110 requests and receives source code or electronic documents of the TPR 305, and renders/displays the link's target, namely the TPR 305. Here, the TPC 115T is a pop-up advertisement for a tic-tac-toe mobile game, which is displayed when the user opens the mobile app 115 or visits the mobile-optimized web page/web app 115. In the example of FIG. 2, the user v05 is attempting to close the TPC 115T/graphical object 205 by selecting the close GCE 210 (depicted as a circle with an X or "⊗" in FIG. 2). However, the user v05 did not properly select the close GCE 210 resulting in mistakenly tapping on the graphical object 205, which activates the link of the graphical object 205 thereby causing the client system 105 to launch TPR 305 of GUI instance 300 in FIG. 3.

In the example of FIGS. 2-3, the target TPR 305 is a webpage, however, if the target TPR 305 is not a webpage, depending on the file type of the TPR 305 and/or the browser 110 and/or plugins, another program/app 110 may be activated to open the TPR 305. For example, the TPR 305 could be a mobile application listing or product page in a digital distribution platform (e.g., iOS® App Store, Google Play®, and the like), and the activated TPGO may cause the mobile system 105 to open a digital distribution platform application to display the TPR 305.

Figure 4:
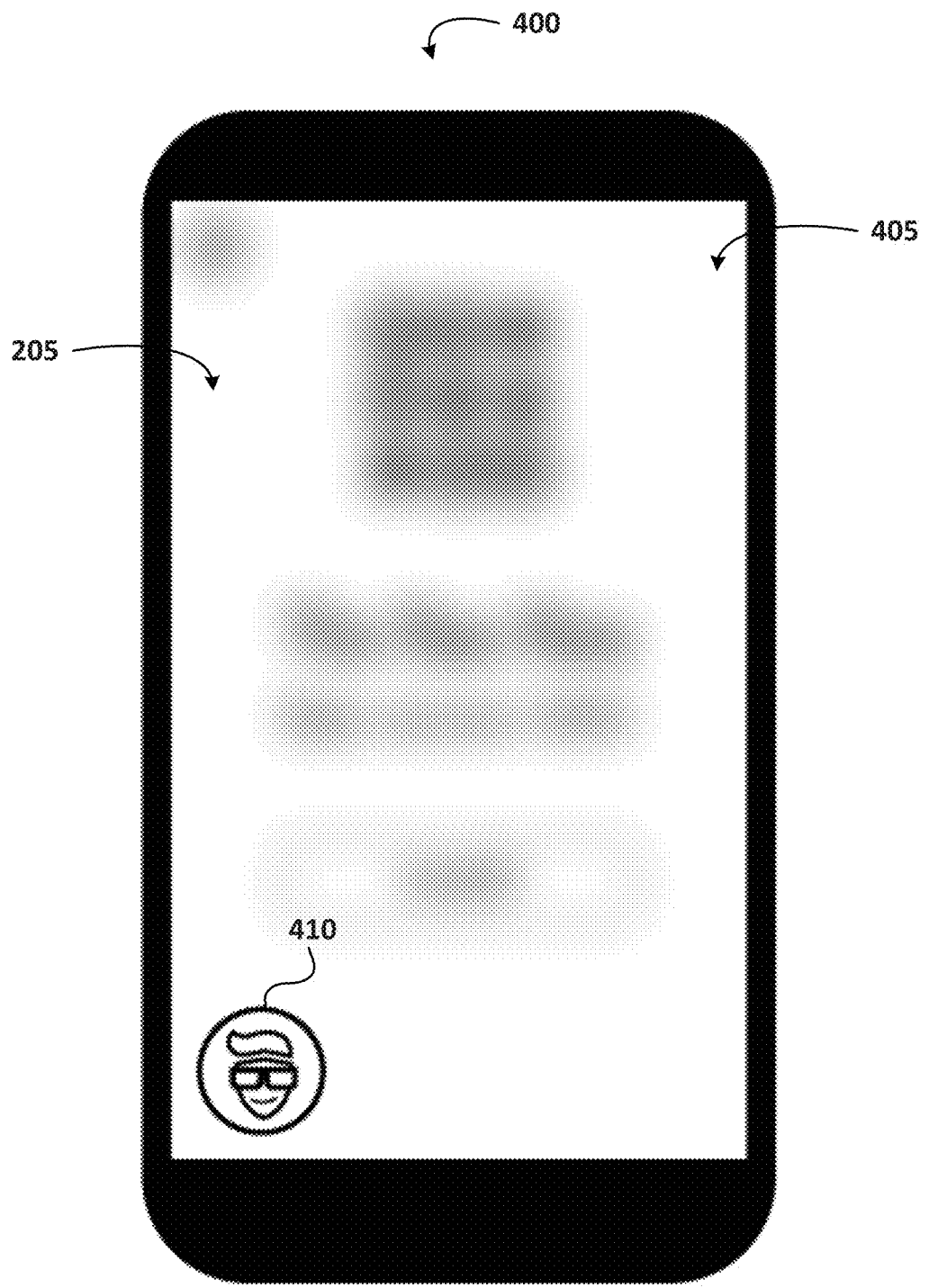
Figure 5:
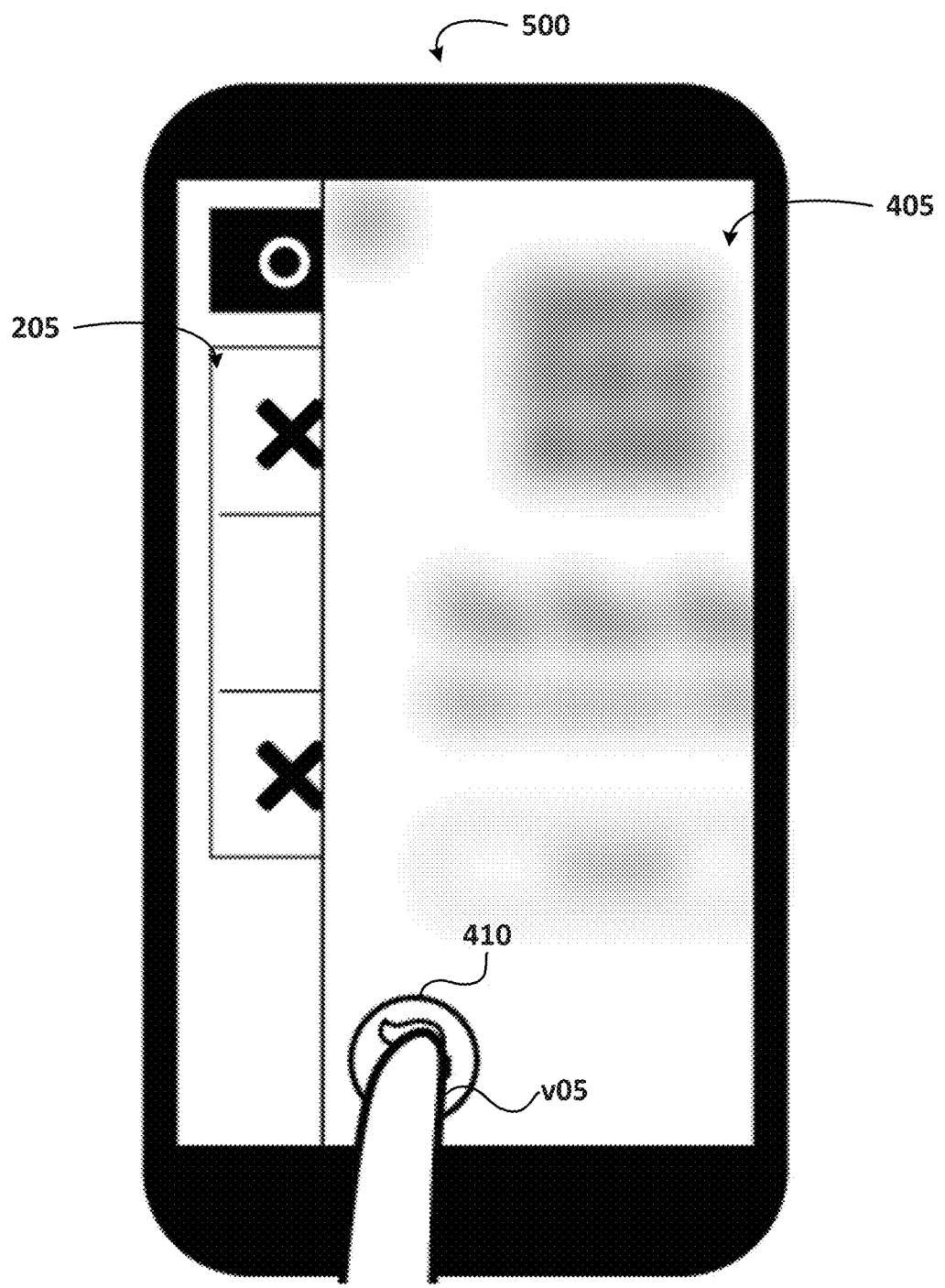

According to various embodiments, when the graphical object 205 is identified as a TPC 115T served by or sourced from a third party entity (e.g., TPP 125 of FIG. 1), a protective measure 405 is placed on top of, or otherwise applied to, the graphical object 205 as is shown by FIGS. 4 and 5. Referring to FIGS. 4 and 5, the protective measure 405 is used to protect the user v05 from mis-tapping the TPC 115T.

As shown by the GUI instance 400 in FIG. 4, the protective measure 405 obfuscates the TPC 115T to indicate that the graphical object 205 is a TPC 115T. The protective measure 405 is a protective wrapper or window that prevents user inputs (e.g., taps, gestures, etc.) from being accepted by the mobile system 105. The protective measure 405 also includes a GCE 410, which allows the user v05 to remove the protective measure 405 to reveal the graphical object 205 underneath the protective measure 405, which is shown by FIG. 5. In FIG. 5, the user v05 has performed a tap-and-hold gesture on the GCE 410, and is performing a slide gesture while holding the GCE 410. The sliding of the GCE 410 reveals the graphical object 205 underneath the protective measure 405. In this example, the amount or portion of the graphical object 205 shown/revealed is based on the amount the user v05 slides the GCE 410 across the screen.

Other gestures and/or graphical representations may be used to reveal the graphical object 205. In one example, a tap-and-hold gesture on the GCE 410 for a predefined period of time (e.g., without performing a sliding gesture) may cause the protective measure 405 to become transparent to reveal the graphical object 205. In one example, a double-tap gesture on the GCE 410 for a predefined period of time (e.g., without performing a sliding gesture) may cause the protective measure 405 to become transparent for a predefined period of time to reveal the graphical object 205. In either of these examples, the protective measure 405 may be removed by performing, for example, a flick gesture or some other suitable gesture on the GCE 410. Additionally or alternatively, a suitable animation or the like may be used to reveal the graphical object 205 and/or show the protective measure 405 being removed.

Referring to FIGS. 6-9, which show example GUI instances 600-900, respectively, related to an example direct link scenario/problem. In the example illustrated by FIGS.

Figure 6:
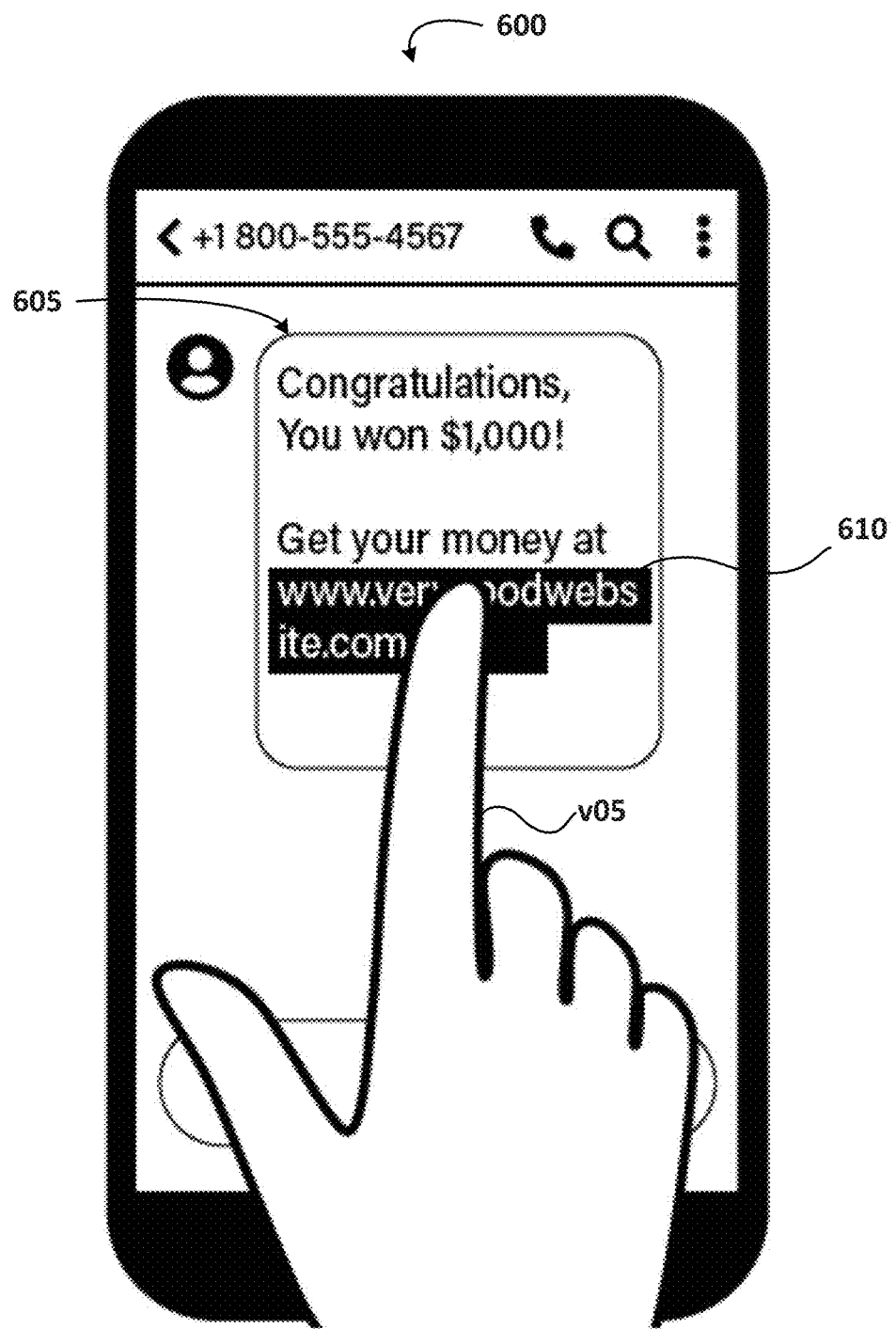
Figure 7:

6-9, the app 110 is a messaging app (also referred to as a "social messaging app," "chat application," "text messaging app," and/or the like). In the example of FIG. 6, the GUI instance 600 displays a graphical object 605, which is a message that includes a link 610 to a TPR 705 (see e.g., FIG. 7). The message may have been sent by a chatbot or some other advertising mechanism. In the example of FIG. 6, the user v05 intentionally or unintentionally selected the link 610 by touching or taping an area of the GUI instance 600 where the link 610 is located. The selection of the link 610 is depicted by the black background with white text in FIG. 6. The selection of the link 610 in FIG. 6 causes the client system 105 to launch a browser 710 of GUI instance 300 and access the TPR 705 as shown by FIG. 7. In this example, the target TPR 705 is a webpage, however, if the target is not a webpage, depending on the file type and/or other criteria of the target TPR 705, another program/app may be activated to display the TPR 705.

Figure 8:
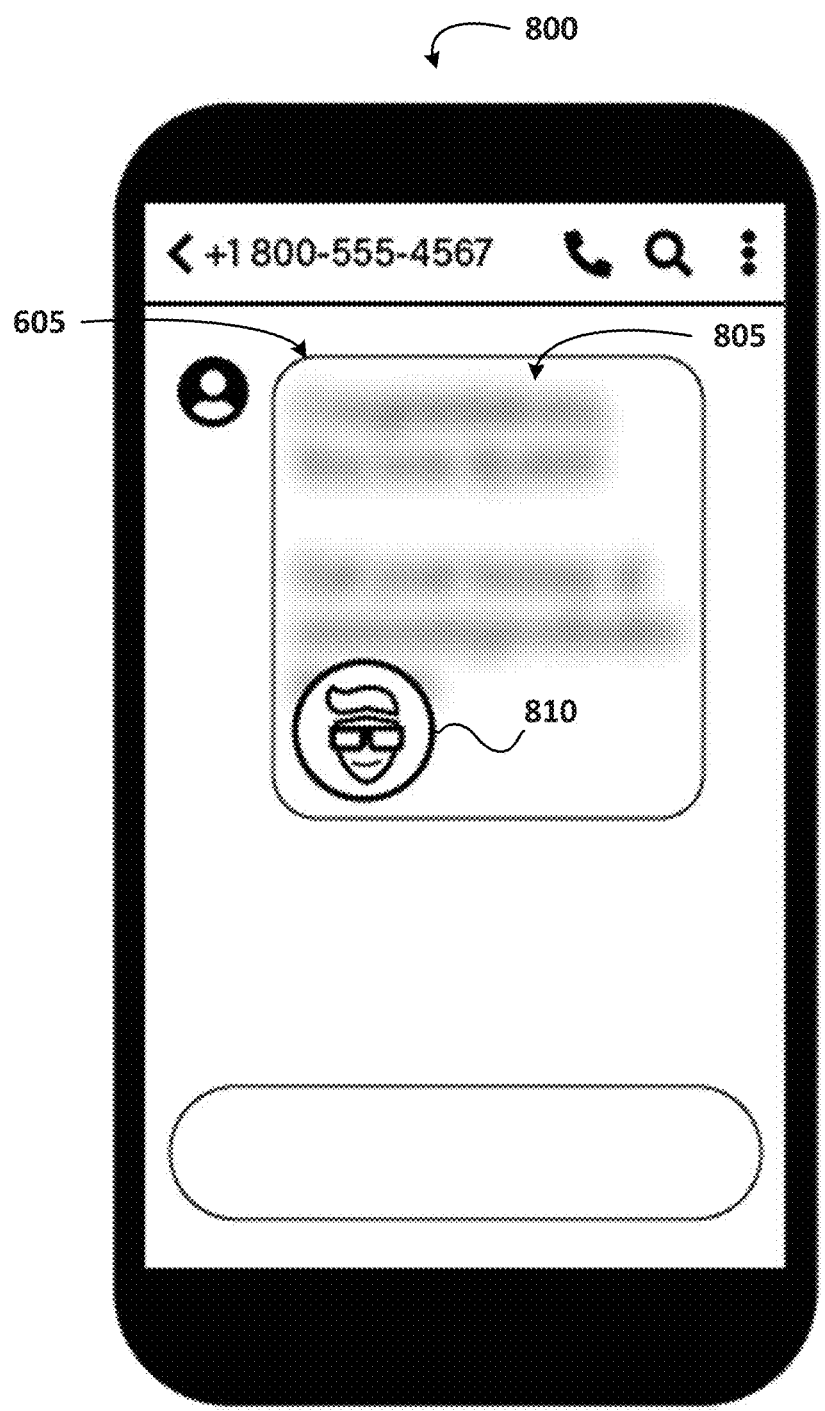
Figure 9:

According to various embodiments, when the graphical object 605 is identified as a an advertisement or served by or sourced from a third party entity (e.g., TPP 125 of FIG. 1), a protective measure 805 is placed on top of, or otherwise applied to, the graphical object 605 as is shown by FIGS. 8 and 9. Referring to FIGS. 8 and 9, the protective measure 805 is used to protect the user v05 from mis-tapping the link 610.

As shown by the GUI instance 800 in FIG. 8, the protective measure 805 obfuscates the message to indicate that the graphical object 605 is an ad or a TPC 115T. The protective measure 805 is similar to the protective measure 405 of FIG. 4; however, in this embodiment, only the portion of the GUI instance 0700 that includes the TPC 115T (e.g., the message 605) is obfuscated. Similar to protective measure 405, the protective measure 805 is a protective wrapper or window that prevents user inputs (e.g., taps, gestures, etc.) from being accepted by the mobile system 105. In some embodiments, the wrapper or window is generated to be a same size and shape as the message 605 and is only placed on top of the message 605. In other embodiments, the wrapper or window is generated to take up the entire display size, but only includes the distinguishing effect at or on the message 605.

The protective measure 805 also includes a GCE 810, which allows the user v05 to remove the protective measure 805 to reveal the graphical object 605 underneath the protective measure 805, which is shown by FIG. 9. In FIG. 9, the user v05 has performed a flick gesture on the GCE 810, which reveals the graphical object 605 underneath the protective measure 805. A suitable animation may be played to show the protective measure 810 being removed.

Other gestures and/or graphical representations may be used to reveal the graphical object 205. In one example, a tap-and-hold gesture and sliding gesture may be used to reveal the graphical object 605 similar to the manner discussed with respect to FIGS. 4-5. In another example, a tap-and-hold gesture on the GCE 810 for a predefined period of time (e.g., without performing a sliding gesture) may cause the protective measure 805 to become transparent to reveal the graphical object 605. In another example, a double-tap gesture on the GCE 810 for a predefined period of time (e.g., without performing a sliding gesture) may cause the protective measure 805 to become transparent for a predefined period of time to reveal the graphical object 605. In either of these examples, the protective measure 805 may be removed by performing, for example, a flick gesture or some other suitable gesture on the GCE 810. Additionally or alternatively, a suitable animation or the like may be used to reveal the graphical object 605 and/or show the protective measure 805 being removed.

Figure 10:
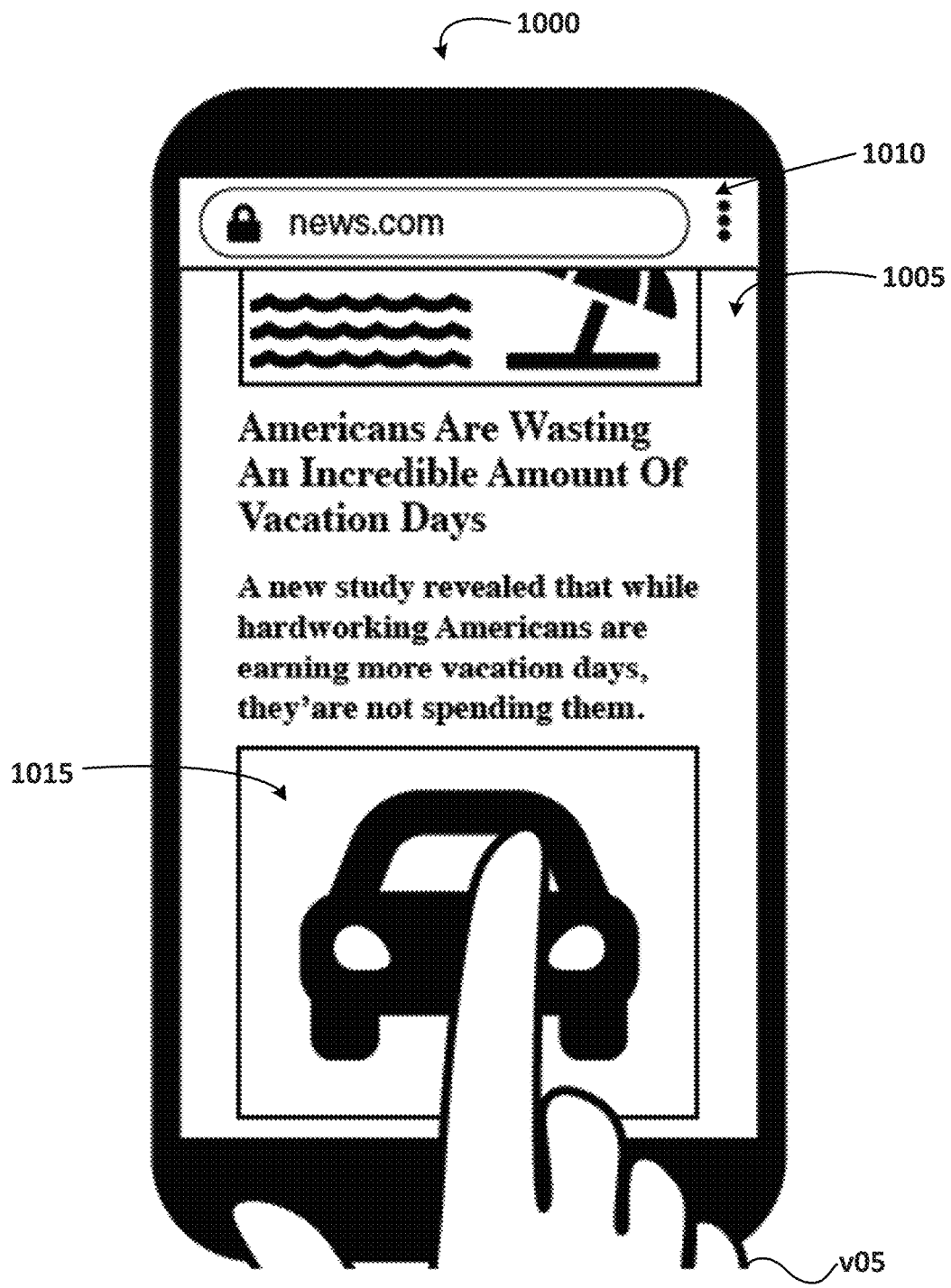
Figure 11:

Referring to FIGS. 10-13, which show example GUIs instances 1000-1300, respectively, related to an example scrolling scenario. In the example illustrated by FIGS. 10-13, the app 110 is a browser 1010, which renders a website 1005 (or "web app 1005"). In the example of FIG. 10, the GUI instance 1000 displays the website 1005, which is a news website or news aggregation webpage. The website 1005 includes a graphical object 1015, which is TPC 115T that is a visual representation of a corresponding TPR 1110 of FIG. 11. In this example, the TPC 115T is web advertisement for a car sales website, which is displayed when the user selects the graphical object 1015. In the example of FIG. 10, the user v05 is attempting to scroll through the website 1005 by pressing the touch interface of the mobile system 105 and swiping in an upwards or downward direction (with respect to the orientation of the mobile system 105). However, the user v05 inadvertently selects the TPC 115T by tapping on the graphical object 1015, which causes the mobile system 105 to launch the TPR 1110 of GUI instance 1100 as shown by FIG. 11.

Figure 12:
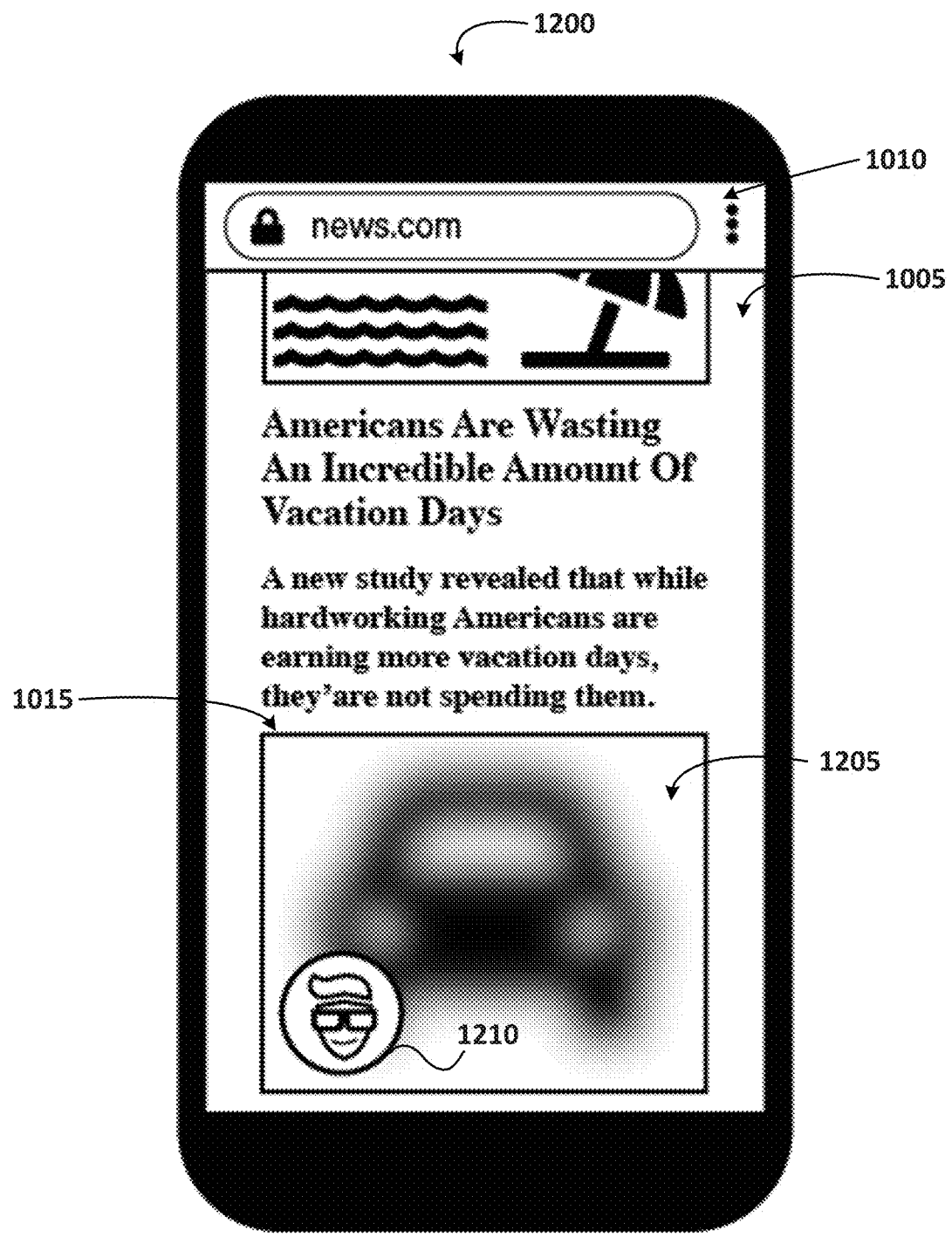
Figure 13:
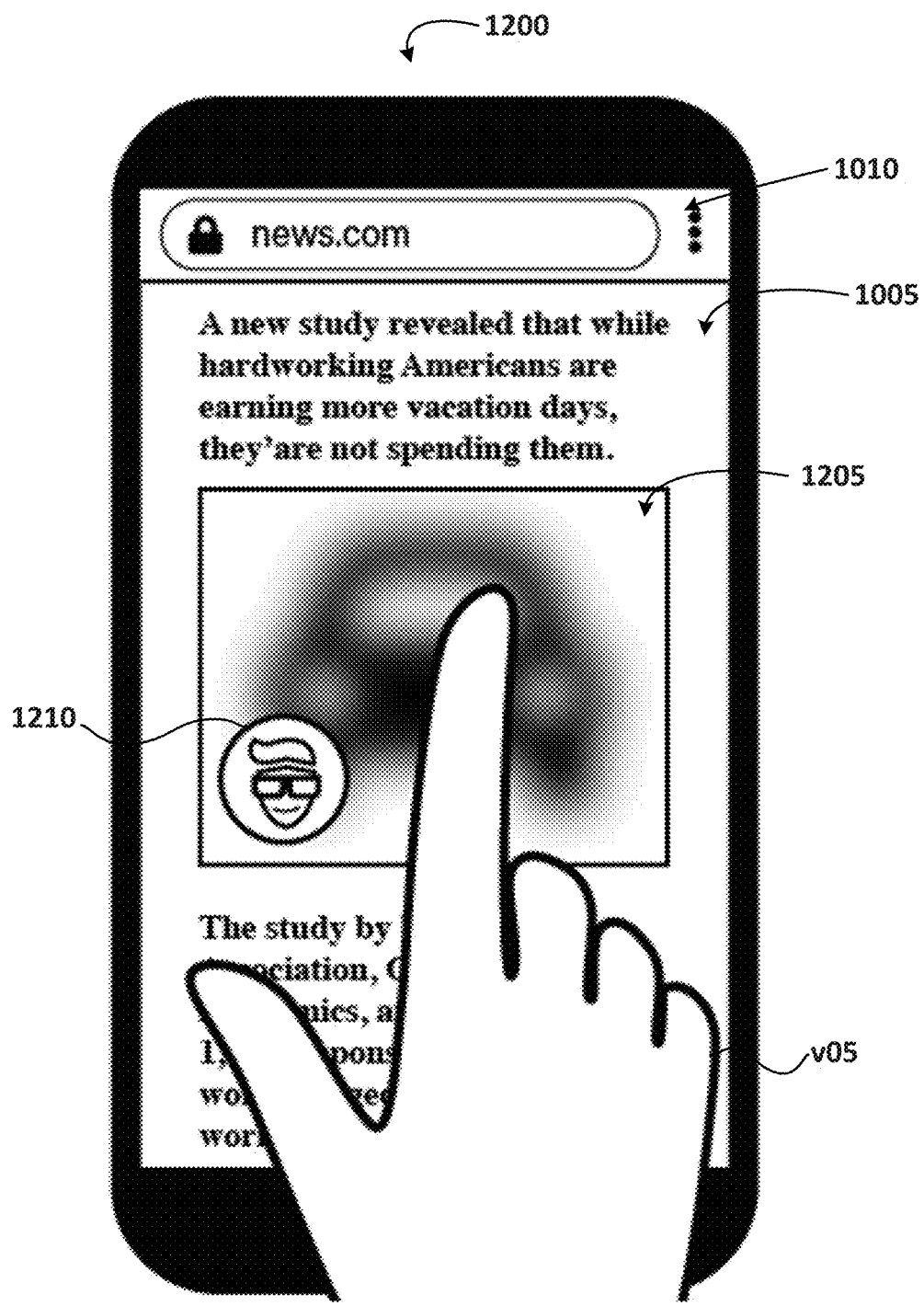

According to various embodiments, when the graphical object 1015 is identified as a an advertisement or determined to have been served by or sourced from a third party entity (e.g., TPP 125 of FIG. 1), a protective measure 1205 is placed on top of, or otherwise applied to, the graphical object 1015 as is shown by FIGS. 12 and 13. Referring to FIGS. 12 and 13, the protective measure 1205 is used to protect the user v05 from mis-tapping the graphical object 605 while scrolling through the website 1005.

As shown by the GUI instance 1200 in FIG. 12, the protective measure 1205 obfuscates the message to indicate that the graphical object 1015 is an ad or a TPC 115T. The protective measure 1205 is similar to the protective measure protective measure 805 of FIG. 8 in that only the portion of the GUI instance 1100 that includes the TPC 115T (e.g., the graphical object 1015) is obfuscated. Similar to protective measure 805, the protective measure 1205 is a protective wrapper or window that prevents user inputs (e.g., taps, gestures, etc.) from being accepted by the mobile system 105. As shown by FIG. 13, the user v05 is able to safely scroll through the website 1005 with the protective measure 1205 in place. In some embodiments, the wrapper or window is generated to be a same size and shape as the graphical object 1015 and is only placed on top of the graphical object 1015 within the website 1005. In other embodiments, the wrapper or window is generated to take up the entire display size of the touch interface, but only includes the distinguishing effect at or on the graphical object 1015.

The protective measure 1205 also includes a GCE 1210, which allows the user v05 to remove the protective measure 1205 to reveal the graphical object 1015 underneath the protective measure 1205. To reveal the graphical object 605 underneath the protective measure 1205, the user v05 may perform a flick gesture on the GCE 1210 or the protective measure 1205, a tap-and-hold gesture on the GCE 1210 or the protective measure 1205, a swipe gesture on the GCE 1210 or the protective measure 1205, and/or some other suitable gesture(s) or input(s). In some embodiments, a suitable animation may be played to show the protective measure 1210 being removed from the graphical object 1015.

FIGS. 4-5, 8, and 12-13 show the TPC 115T being obfuscated with a blurring effect. Any suitable blurring effect may be used for such embodiments, such as by using Gaussian blurring, box blurring, Bokeh blurring, or some other blurring effect. In other embodiments, some other obfuscation technique may be used, such as by using an opacity filter (e.g., "opacity(<number-percentage>)" in CSS with a <number-percentage> value under 20%), using a brightness function with a relatively low brightness value (e.g., using the "brightness(<number-percentage>)" in CSS with a <number-percentage> value under 100%), redacting the deceptor 115d or the like. Additionally or alternatively, the blurring effect may be influenced by TPR ranking indicated by a distinction indicator as mentioned previously. For example, where a Gaussian blur effect is used, each pixel making up or surrounding the TPC 115T is weighted based on their distance to a center pixel such that pixels that are closer to the center pixel will have a greater weight, and more distant pixels will have a lower weight. In this example, the ranking or distinction indicator may indicate an average weight to be applied to the pixels making up and/or surrounding the TPCs 115T, or an extent to which the blurring increases or decreases between the center of visual representation of the TPCs 115T and its edges. In this way, the TPR ranking or distinction indicator may cause the app 110 or component 113 to produce the blur effect with a specific factor or with a specific intensity distribution or profile. The percentage blur factor values in the aforementioned examples may refer to an intensity of the obfuscation, and may be based on the particular implementation used. It should be noted that the TPCs 115T may be obfuscated using a different percentages and/or blur factor values other than using the rankings/scores discussed previously. For example, the CSS blur( ) function takes an input of a number of pixels or a radius length (e.g., "filter: blur(<length>)"), and in these embodiments, the blur factor may be based on a percentage of the number of pixels to be blurred or a percentage of a maximum radius of a perimeter around the TPCs 115T.

In any of the aforementioned embodiments, removal of the obfuscation may be done using a suitable optical effect, such as having the obfuscation fade out or fade away, or using some sort of animation to reveal the TPC 115T over some period of time. In other embodiments, the TPC 115T may be partially revealed in response to the user v05 tapping-and-holding the protective measure and/or the GCE of the protective measure. Additionally, the app 110 or component 113 may return the obfuscation to the TPC 115T when the user performs some gesture (or combination or gestures), or reloads the application or webpage in which the obfuscation is applied. The app 110 or component 113 may use an optical effect, such as a fade-in or an animation, when (re)generating the obfuscation. Additionally, a suitable delay may be applied to removal and/or (re)generation of the obfuscation, which may aid in the identification and/or readability of the TPC 115T. Additionally or alternatively, the obfuscation may be added or removed from portions of the TPC 115T as the user v05 performs the predefined gesture(s) on the protective measure (e.g., performs a slide, swipe, drag, or flick gesture), similar to an image reveal slider or the like. In the aforementioned embodiments, the TPC 115T itself is obfuscated, which is more effective than using other TPC 115T identification means, such as adding an icon in the address box of the browser, adding an icon next to the TPR itself, or attempting to block or disable the TPCs 115T. Allowing the obfuscation to be removed (or fade away) when the user performs one or more gestures on protective measure applied to the TPC 115T itself is advantageous because it does not require the user v05 to perform any additional actions or gestures to expose the TPR 115d, and also allows the user v05 to use the applications and websites as intended. This allows the user v05 to avoid unintentionally loading TPRs, which may conserve computational and networking resources of the mobile device 105 and the SPP 120 (as well as intermediary devices and/or appliances such as routers, switches, base stations, etc.). In this way, the automatic generation or removal of the obfuscation based on user v05 gestures/inputs provides the user with a frictionless experience and with no additional computational overhead for creating/rendering additional GUI instances.

Figure 14:
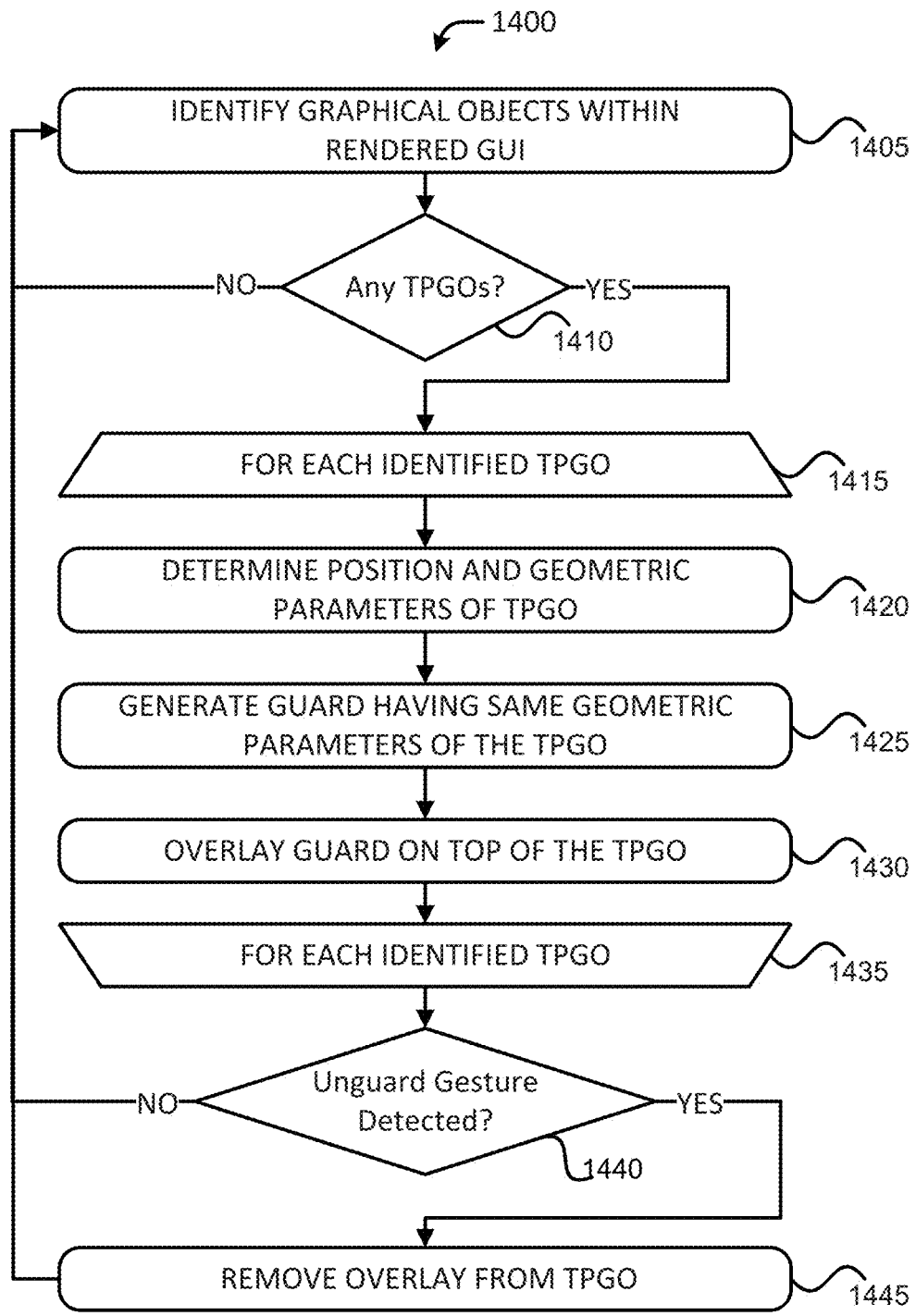
FIG. 14 illustrates an example process for generating and rendering user interfaces (UIs) in accordance with various embodiments.
Figure 15:
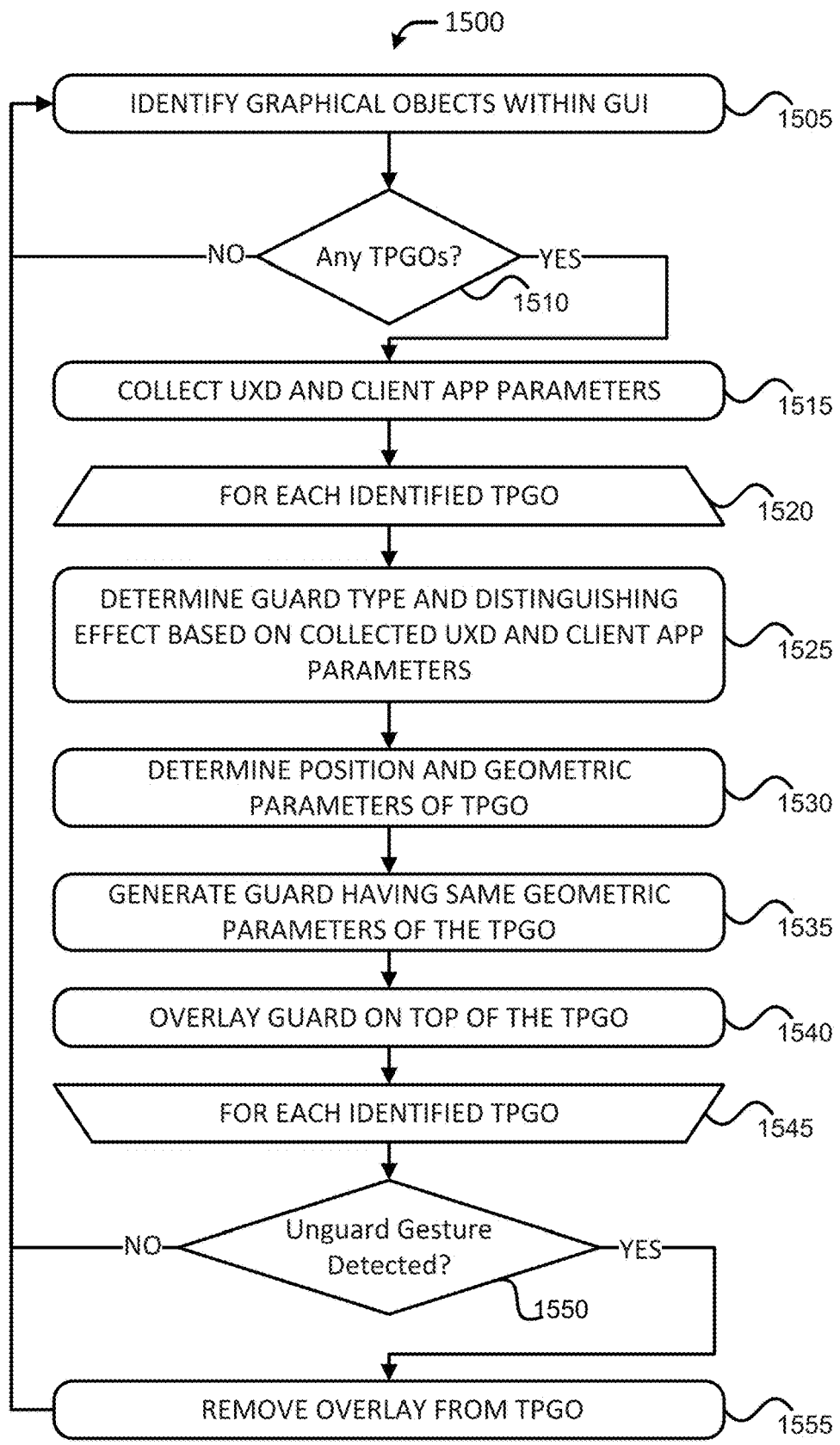
FIG. 15 illustrates an example process for applying distinguishing effects to a third party resource in accordance with various embodiments.

FIGS. 14-15 illustrate example processes 1400 and 1500, respectively, in accordance with various embodiments. For illustrative purposes, the operations of each of processes 1400 and 1500 are described as being performed by the app 110 and the component 113 operated by the client system 105 discussed previously with respect to FIGS. 1-13. In embodiments, a processor system of the client system 105 (e.g., processor circuitry 1602 shown by FIG. 16) executes program code of the app 110 and program code of the component 113 to perform the operations of processes 1400 and 1500. Additionally, a communication system of the client system 105 (e.g., communication circuitry 1609 of FIG. 16) is used to communicate (transmit/receive) messages with the SPP 120, TPP 125, and/or verification service 140. While particular examples and orders of operations are illustrated in FIGS. 14-15, in various embodiments, these operations may be re-ordered, broken into additional operations, combined, and/or omitted altogether. Furthermore, in some embodiments the operations illustrated in FIG. 14-15 may be combined with operations described with regard to other example embodiments and/or one or more operations described with regard to the non-limiting examples provided herein.

Referring now to FIG. 14, an example process 1400 for generating and rendering a GUI according a first embodiment, is shown. Process 1400 begins at operation 1405, where the component 113 identifies graphical objects within a rendered GUI, which may be a GUI provided by a client app 110, a web app 115, or the like. At operation 1410, the component 113 determines whether any of the identified graphical objects are TPGOs. If none of the identified graphical objects are TPGOs, then the component 113 loops back to operation 1405 to identify graphical objects within a next instance of the GUI. If any of the identified graphical objects are TPGOs, then the component 113 proceeds to open loop operation 1415 to process each identified TPGO, in turn. At operation 1420, the component 113 determines position and geometric parameters of the TPGO, and at operation 1425 the component 113 generates a guard or protective measure having the same position and geometric parameters as the TPGO, which is then overlaid on top of the TPGO at operation 1435. At close loop operation 1435, the component 113 proceeds back to the open loop operation 1415 to process a next identified TPGO, if any. When there are no more identified TPGOs to process, the component 113 proceeds back to operation 1405 to identify graphical objects within a next instance of the GUI. At operation 1440, the component 113 determines whether an unguard gesture is detected. If an ungaurd gesture is not detected, component 113 proceeds back to operation 1405 to identify graphical objects within a next instance of the GUI. If an ungaurd gesture is detected at operation 1440, component 113 proceeds to operation 1445 to remove the guard from the TPGO, and then proceeds back to operation 1405 to identify graphical objects within a next instance of the GUI. After performance of operation 1445, process 1400 may continue operating or terminate when desired.

Referring now to FIG. 15, an example process 1500 for generating and rendering a GUI according to a second embodiment, is shown. Process 1500 begins at operation 1505, where the component 113 identifies graphical objects within a rendered GUI, which may be a GUI provided by a client app 110, a web app 115, or the like. At operation 1510, the component 113 determines whether any of the identified graphical objects are TPGOs. If none of the identified graphical objects are TPGOs, then the component 113 loops back to operation 1505 to identify graphical objects within a next instance of the GUI. If any of the identified graphical objects are TPGOs, then the component 113 proceeds to operation 1515 to collect UXD and/or parameters of the client app 110/115. At open loop operation 1520 to process each identified TPGO, in turn. At operation 1530, the component 113 determines a guard type and distinguishing effect for the guard based on the collected UXD and/or client app 110/115 parameters. In embodiments, the component 113 may operate an ML model using the collected UXD and/or client app 110/115 parameters as inputs, and obtain the guard type and/or distinguishing effect parameters as an output. The distinguishing effect parameters may include, for example, the type of distinguishing effect to be applied (e.g., blurring, blackout, different colors, animations, etc.), distinction factor/distinction intensity value, and/or the like. At operation 1530, the component 113 determines position and geometric parameters of the TPGO, and at operation 1535 the component 113 generates a guard or protective measure having the same position and geometric parameters as the TPGO, which is then overlaid on top of the TPGO at operation 1540. At close loop operation 1545, the component 113 proceeds back to the open loop operation 1520 to process a next identified TPGO, if any. When there are no more identified TPGOs to process, the component 113 proceeds back to operation 1505 to identify graphical objects within a next instance of the GUI. At operation 1550, the component 113 determines whether an unguard gesture is detected. If an ungaurd gesture is not detected, component 113 proceeds back to operation 1505 to identify graphical objects within a next instance of the GUI. If an ungaurd gesture is detected at operation 1550, component 113 proceeds to operation 1555 to remove the guard from the TPGO, and then proceeds back to operation 1505 to identify graphical objects within a next instance of the GUI. After performance of operation 1555, process 1500 may continue operating or terminate when desired.

Referring to both FIGS. 14 and 15, it should be noted that the TPGOs processed at operations 1415 to 1435 in process 1400 and operations 1520 to 1545 of process 1500 may be the rendered (drawn) on a surface of a particular window, and the component 113 may identify graphical objects each time new graphical objects are drawn on the surface, such as when the user of mobile system 105 performs a scrolling operation or the like.

In some embodiments, in order to identify the graphical objects and/or TPGOs within the rendered GUI at operations 1405 and 1505 of processes 1400 and 1500, respectively, the component 113 may execute a locator strategy to locate individual GUI elements within the GUI (or the source code of the GUI) that correspond to respective graphical objects within the GUI. As examples, the locator strategy may be an XPath locator strategy, an element id or resource id locator strategy, a class name locator strategy, a predicate string locator strategy, or an accessibility id locator strategy. In some embodiments, the component 113 may operate an ML model to identify the TPGOs to be guarded or determine which of the graphical objects should be guarded at operations 1410 and 1510 of processes 1400 and 1500, respectively.

In embodiments, the unguard gesture at operations 1440 and 1550 of processes 1400 and 1500, respectively, may be performed on or around the guard, and may involve performing such a gesture on a guard GCE that is also included on the overlay. As examples, the unguard gesture may be a tap-and-hold gesture for a predefined period of time, a tap-and-hold-and-slide gesture on the guard GCE, a swipe gesture on the guard or guard GCE (in one or different directions), a flick gesture on the guard or guard GCE (in one or different directions), and/or the like. In some embodiments, removal of the guard at operations 1445 and 1555 of processes 1400 and 1500, respectively, may involve the component 113 removing the overlay from the TPGO in response to detection of the unguard gesture. In some embodiments, removal of the guard at operations 1445 and 1555 of processes 1400 and 1500, respectively, may involve the component 113 removing the distinguishing effect from the guard (or making the guard transparent to show the underlying TPGO) in response to detection of the unguard gesture, and passing inputs received by the guard to the underlying TPGO in response to detection of some other touch inputs after the guard is removed. In some embodiments, removal of the guard may be shown using a suitable animation or some other feedback mechanism.

FIG. 16 illustrates an example of an computing system 1600 (also referred to as "platform 1600," "device 1600," "appliance 1600," or the like) in accordance with various embodiments. The system 1600 may be suitable for use as any of the computer devices discussed herein, such as client system 105, a server of the SPP 120, or a verification server 145. The components of system 1600 may be implemented as an individual computer system, or as components otherwise incorporated within a chassis of a larger system. The components of system 1600 may be implemented as integrated circuits (ICs) or other discrete electronic devices, with the appropriate logic, software, firmware, or a combination thereof, adapted in the computer system 1600. Additionally or alternatively, some of the components of system 1600 may be combined and implemented as a suitable System-on-Chip (SoC), System-in-Package (SiP), multi-chip package (MCP), or the like.

The system 1600 includes processor circuitry 1602, which is configured to execute program code, and/or sequentially and automatically carry out a sequence of arithmetic or logical operations; record, store, and/or transfer digital data. The processor circuitry 1602 includes circuitry such as, but not limited to one or more processor cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (I/O), memory card controllers, interconnect (IX) controllers and/or interfaces, universal serial bus (USB) interfaces, mobile industry processor interface (MIPI) interfaces, Joint Test Access Group (JTAG) test access ports, and the like. The processor circuitry 1602 may include on-chip memory circuitry or cache memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1602 may include, for example, one or more processor cores (CPUs), one or more graphics processing units (GPUs), one or more reduced instruction set computing (RISC) processors, one or more Acorn RISC Machine (ARM) processors, one or more complex instruction set computing (CISC) processors, one or more DSPs, one or more programmable logic devices (PLDs), one or more FPGAs, ASICs one or more microprocessors or controllers, or any suitable combination thereof. Individual processors (or individual processor cores) of the processor circuitry 1602 may be coupled with or may include memory/storage and may be configured to execute instructions stored in the memory/storage to enable various applications or operating systems to run on the system 1600. In these embodiments, the processors (or cores) of the processor circuitry 1602 are configured to operate application software (e.g., app 110, component 113, one or more server-side applications, ad server applications, verification service 140 applications, etc.) to provide specific services to a user of the system 1600. In some embodiments, the processor circuitry 1602 may include special-purpose processor/controller to operate according to the various embodiments herein.

As examples, the processor circuitry 1602 may include Intel® Core™ based processor(s), MCU-class processor(s), Pentium® processor(s), Xeon® processor(s); Advanced Micro Devices (AMD) Zen® Architecture processor(s) such as Ryzen® or Epyc® processor(s), or other AMD processors such as Accelerated Processing Units (APUs), MxGPUs, or the like; A5-12 and/or S1-S4 processor(s) from Apple® Inc.; Snapdragon™ or Centrig™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; or the like. Other examples of the processor circuitry 1602 may be mentioned elsewhere in the present disclosure.

In some implementations, such as when system 1600 is (or is part of) a server computer system, the processor circuitry 1602 may include one or more hardware accelerators. The hardware accelerators may be microprocessors, configurable hardware (e.g., field-programmable gate arrays (FPGAs), programmable Application Specific Integrated Circuits (ASICs), programmable SoCs, digital signal processors (DSP), etc.), or some other suitable special-purpose processing device tailored to perform one or more specific tasks. The hardware accelerators may be hardware devices that perform various functions that may be offloaded from an one or more processors of the processor circuitry 1602. In these embodiments, the circuitry of processor circuitry 1602 may comprise logic blocks or logic fabric including and other interconnected resources that may be programmed to perform various functions, such as the procedures, methods, functions, etc. of the various embodiments discussed herein. Additionally, the processor circuitry 1602 may include memory cells (e.g., EPROM, EEPROM, flash memory, static memory (e.g., SRAM, anti-fuses, etc.) used to store logic blocks, logic fabric, data, etc. in LUTs and the like. In embodiments where subsystems of the computing system 1600 are implemented as individual software agents or AI agents, each agent may be implemented in a respective hardware accelerator that are configured with appropriate bit stream(s) or logic blocks to perform their respective functions In some implementations, processor(s) and/or hardware accelerators of the application circuitry 1602 may be specifically tailored for operating the software (AI) agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as a Hexagon DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the Hi Silicon Kirin 970 provided by Huawei®, and/or the like.

The system memory circuitry 1604 comprises any number of memory devices arranged to provide primary storage from which the processor circuitry 1602 continuously reads instructions 1682 stored therein for execution. In some embodiments, the memory circuitry 1604 is on-die memory or registers associated with the processor circuitry 1602. As examples, the memory circuitry 1604 may include volatile memory such as random access memory (RAM), dynamic RAM (DRAM), synchronous DRAM (SDRAM), etc. The memory circuitry 1604 may also include nonvolatile memory (NVM) such as high-speed electrically erasable memory (commonly referred to as "flash memory"), phase change RAM (PRAM), resistive memory such as magnetoresistive random access memory (MRAM), etc. The memory circuitry 1604 may also comprise persistent storage devices, which may be temporal and/or persistent storage of any type, including, but not limited to, non-volatile memory, optical, magnetic, and/or solid state mass storage, and so forth.

Storage circuitry 1608 is arranged to provide persistent storage of information such as data, applications, operating systems (OS), and so forth. As examples, the storage circuitry 1608 may be implemented as hard disk drive (HDD), a micro HDD, a solid-state disk drive (SSDD), flash memory cards (e.g., SD cards, microSD cards, xD picture cards, and the like), USB flash drives, on-die memory or registers associated with the processor circuitry 1602, resistance change memories, phase change memories, holographic memories, or chemical memories, and the like. In some implementations, the storage circuitry 1608 and/or memory circuitry 1604 may be disposed in or on a same die or package as the processor circuitry 1602 (e.g., a same SoC, a same SiP, or soldered on a same MCP as the processor circuitry 1602).

The storage circuitry 1608 is configured to store computational logic 1683 (or "modules 1683") in the form of software, firmware, microcode, or hardware-level instructions to implement the techniques described herein. The computational logic 1683 may be employed to store working copies and/or permanent copies of programming instructions for the operation of various components of system 1600 (e.g., drivers, libraries, application programming interfaces (APIs), etc.), an OS of system 1600, one or more applications, and/or for carrying out the embodiments discussed herein (such as one or more operations of processes 1400-1500 of FIGS. 14-15). The computational logic 1683 may be stored or loaded into memory circuitry 1604 as instructions 1682, which are then accessed for execution by the processor circuitry 1602 to carry out the functions described herein. The various elements may be implemented by assembler instructions supported by processor circuitry 1602 or high-level languages that may be compiled into instructions 1681 to be executed by the processor circuitry 1602. The permanent copy of the programming instructions may be placed into persistent storage devices of storage circuitry 1608 in the factory or in the field through, for example, a distribution medium (not shown), through a communication interface (e.g., from a distribution server (not shown)), or over-the-air (OTA).

In an example, the instructions 1682 provided via the memory circuitry 1604 and/or the storage circuitry 1608 of FIG. 16 are embodied as one or more non-transitory computer readable storage media (see e.g., NTCRSM 1660) including program code, a computer program product or data to create the computer program, with the computer program or data, to direct the processor circuitry 1602 of platform 1600 to perform electronic operations in the platform 1600, and/or to perform a specific sequence or flow of actions, for example, as described with respect to the flowchart(s) and block diagram(s) of operations and functionality depicted previously. The processor circuitry 1602 accesses the one or more non-transitory computer readable storage media over the interconnect 1606.

In alternate embodiments, programming instructions (or data to create the instructions) may be disposed on multiple NTCRSM 1660. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1660 may be embodied by devices described for the storage circuitry 1608 and/or memory circuitry 1604. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1683, instructions 1682, 1681 discussed previously) may be written in any combination of one or more programming languages such as, for example, Python, PyTorch, NumPy, Ruby, Ruby on Rails, Scala, Smalltalk, Java®, Kotlin®, C++, C#, "C", Rust, Go (or "Golang"), JavaScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Nodejs, ASP.NET, JAMscript, Hypertext Markup Language (HTML), XML, EXI, XSL, XSD, wiki markup or Wikitext, Wireless Markup Language (WML), JSON, Apache® MessagePack™, Cascading Stylesheets (CSS), Mustache template language, Handlebars template language, Guide Template Language (GTL), Apache®

Thrift, ASN.1, protobuf, Android® Studio™ integrated development environment (IDE), Apple® iOS® software development kit (SDK), and/or any other programming language or development tools including proprietary programming languages and/or development tools. The computer program code for carrying out operations of the present disclosure may also be written in any combination of the programming languages discussed herein. The program code may execute entirely on the system 1600, partly on the system 1600, as a stand-alone software package, partly on the system 1600 and partly on a remote computer or entirely on the remote computer or server. In the latter scenario, the remote computer may be connected to the system 1600 through any type of network, including a LAN or WAN, or the connection may be made to an external computer (e.g., through the Internet using an Internet Service Provider).

In an example, the instructions 1670 on the processor circuitry 1602 (separately, or in combination with the instructions 1682 and/or logic/modules 1683 stored in computer-readable storage media) may configure execution or operation of a trusted execution environment (TEE) 1690. The TEE 1690 operates as a protected area accessible to the processor circuitry 1602 to enable secure access to data and secure execution of instructions. In some embodiments, the TEE 1690 may be a physical hardware device that is separate from other components of the system 1600 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMID® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 1690 may be implemented as secure enclaves, which are isolated regions of code and/or data within the processor and/or memory/storage circuitry of the system 1600. Only code executed within a secure enclave may access data within the same secure enclave, and the secure enclave may only be accessible using the secure application (which may be implemented by an application processor or a tamper-resistant microcontroller). Various implementations of the TEE 1690, and an accompanying secure area in the processor circuitry 1602 or the memory circuitry 1604 and/or storage circuitry 1608 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1600 through the TEE 1690 and the processor circuitry 1602.

Although the instructions 1682 are shown as code blocks included in the memory circuitry 1604 and the computational logic 1683 is shown as code blocks in the storage circuitry 1608, it should be understood that any of the code blocks may be replaced with hardwired circuits, for example, built into an FPGA, ASIC, or some other suitable circuitry. For example, where processor circuitry 1602 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The operating system (OS) of system 1600 may be a general purpose OS or an OS specifically written for and tailored to the computing system 1600. For example, when the system 1600 is a server system or a desktop or laptop systems 105-135, the OS may be Unix or a Unix-like OS such as Linux e.g., provided by Red Hat Enterprise, Windows 10™ provided by Microsoft Corp.®, macOS provided by Apple Inc.®, or the like. In another example where the system 1600 is a mobile device, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. The OS manages computer hardware and software resources, and provides common services for various applications (e.g., application 202, KDF 200, KDF 200, etc.). The OS may include one or more drivers or APIs that operate to control particular devices that are embedded in the system 1600, attached to the system 1600, or otherwise communicatively coupled with the system 1600. The drivers may include individual drivers allowing other components of the system 1600 to interact or control various I/O devices that may be present within, or connected to, the system 1600. For example, the drivers may include a display driver to control and allow access to a display device, a touchscreen driver to control and allow access to a touchscreen interface of the system 1600, sensor drivers to obtain sensor readings of sensor circuitry 1621 and control and allow access to sensor circuitry 1621, actuator drivers to obtain actuator positions of the actuators 1622 and/or control and allow access to the actuators 1622, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from other applications operated by the system 1600.

In an example, the instructions 1682 provided via the memory circuitry 1604 and/or the storage circuitry 1608 are embodied as a non-transitory, machine-readable medium 1660 including code to direct the processor circuitry 1602 to perform electronic operations in the system 1600. The processor circuitry 1602 accesses the non-transitory machine-readable medium 1660 over the interconnect (IX) 1606. For instance, the non-transitory, machine-readable medium 1660 may be embodied by devices described for the storage circuitry 1608 of FIG. 16 or may include specific storage units such as optical disks, flash drives, or any number of other hardware devices. The non-transitory, machine-readable medium 1660 may include instructions 1682 to direct the processor circuitry 1602 to perform a specific sequence or flow of actions, for example, as described with respect to the flowchart(s) and block diagram(s) of operations and functionality depicted previously (see e.g., FIGS. 14-15). In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). In alternate embodiments, the programming instructions may be disposed on multiple computer-readable non-transitory storage media instead. In still other embodiments, the programming instructions may be disposed on computer-readable transitory storage media, such as, signals.

The components of system 1600 communicate with one another over the interconnect (IX) 1606. The IX 1606 may include any number of IX technologies such as industry standard architecture (ISA), extended ISA (EISA), inter-integrated circuit (VC), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath Interconnect (QPI), Intel® Omni-Path Architecture (OPA) IX, RapidIO™ system interconnects, Ethernet, Cache Coherent Interconnect for Accelerators (CCIA), Gen-Z Consortium IXs, Open Coherent Accelerator Processor Interface (OpenCAPI), and/or any number of other IX technologies. The IX 1606 may be a proprietary bus, for example, used in a SoC based system.

The communication circuitry 1609 is a hardware element, or collection of hardware elements, used to communicate over one or more networks (e.g., network 101) and/or with other devices. The communication circuitry 1609 includes modem 1610 and transceiver circuitry ("TRx") 1612. The modem 1610 includes one or more processing devices (e.g., baseband processors) to carry out various protocol and radio control functions. Modem 1610 may interface with application circuitry of system 1600 (e.g., a combination of processor circuitry 1602 and CRM 1660) for generation and processing of baseband signals and for controlling operations of the TRx 1612. The modem 1610 may handle various radio control functions that enable communication with one or more radio networks via the TRx 1612 according to one or more wireless communication protocols. The modem 1610 may include circuitry such as, but not limited to, one or more single-core or multi-core processors (e.g., one or more baseband processors) or control logic to process baseband signals received from a receive signal path of the TRx 1612, and to generate baseband signals to be provided to the TRx 1612 via a transmit signal path. In various embodiments, the modem 1610 may implement a real-time OS (RTOS) to manage resources of the modem 1610, schedule tasks, etc.

The communication circuitry 1609 also includes TRx 1612 to enable communication with wireless networks using modulated electromagnetic radiation through a non-solid medium. TRx 1612 includes a receive signal path, which comprises circuitry to convert analog RF signals (e.g., an existing or received modulated waveform) into digital baseband signals to be provided to the modem 1610. The TRx 1612 also includes a transmit signal path, which comprises circuitry configured to convert digital baseband signals provided by the modem 1610 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 1612 using metal transmission lines or the like. The TRx 1612 may include one or more radios that are compatible with, and/or may operate according to any one or more of the radio communication technologies and/or standards, such as those discussed herein.

Network interface circuitry/controller (NIC) 1616 may be included to provide wired communication to the network 101 or to other devices, such as the mesh devices 1664 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the system 1600 via NIC 1616 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1616 may include one or more dedicated processors and/or FPGAs to communicate using one or more of the aforementioned network interface protocols. In some implementations, the NIC 1616 may include multiple controllers to provide connectivity to other networks using the same or different protocols. For example, the system 1600 may include a first NIC 1616 providing communications to the cloud over Ethernet and a second NIC 1616 providing communications to other devices over another type of network. In some implementations, the NIC 1616 may be a high-speed serial interface (HSSI) NIC to connect the system 1600 to a routing or switching device.

The external interface 1618 (also referred to as "I/O interface circuitry" or the like) is configured to connect or couple the system 1600 with external devices or subsystems. The external interface 1618 may include any suitable interface controllers and connectors to couple the system 1600 with the external components/devices. As an example, the external interface 1618 may be an external expansion bus (e.g., USB, FireWire, Thunderbolt, etc.) used to connect system 1600 with external (peripheral) components/devices. The external devices include, inter alia, sensor circuitry 1621, actuators 1622, and positioning circuitry 1645, but may also include other devices or subsystems not shown by FIG. 16.

The sensor circuitry 1621 may include devices, modules, or subsystems whose purpose is to detect events or changes in its environment and send the information (sensor data) about the detected events to some other a device, module, subsystem, etc. Examples of such sensors 1621 include, inter alia, inertia measurement units (IMU) comprising accelerometers, gyroscopes, and/or magnetometers; micro-electromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1618 connects the system 1600 to actuators 1624, allow system 1600 to change its state, position, and/or orientation, or move or control a mechanism or system. The actuators 1622 comprise electrical and/or mechanical devices for moving or controlling a mechanism or system, and converts energy (e.g., electric current or moving air and/or liquid) into some kind of motion. The actuators 1622 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1622 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The system 1600 may be configured to operate one or more actuators 1622 based on one or more captured events and/or instructions or control signals received from a service provider and/or various client systems. In embodiments, the system 1600 may transmit instructions to various actuators 1622 (or controllers that control one or more actuators 1622) to reconfigure an electrical network as discussed herein.

The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning, Navigation, and Timing (Micro-PNT) IC that uses a master timing clock to perform position tracking/estimation without GNSS assistance. The positioning circuitry 1645 may also be part of, or interact with, the communication circuitry 1609 to communicate with the nodes and components of the positioning network. The positioning circuitry 1645 may also provide position data and/or time data to the application circuitry, which may use the data to synchronize operations with various infrastructure (e.g., radio base stations), for turn-by-turn navigation, or the like.

The input/output (I/O) devices 1686 may be present within, or connected to, the system 1600. The I/O devices 1686 include input device circuitry and output device circuitry including one or more user interfaces designed to enable UIA with the system 1600 and/or peripheral component interfaces designed to enable peripheral component interaction with the system 1600. The input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry is used to show or convey information, such as sensor readings, actuator position(s), or other like information. Data and/or graphics may be displayed on one or more UI components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the system 1600. The output device circuitry may also include speakers or other audio emitting devices, printer(s), and/or the like. In some embodiments, the sensor circuitry 1621 may be used as the input device circuitry (e.g., an image capture device, motion capture device, or the like) and one or more actuators 1622 may be used as the output device circuitry 1684 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

A battery 1624 may be coupled to the system 1600 to power the system 1600, which may be used in embodiments where the system 1600 is not in a fixed location, such as when the system 1600 is a mobile or laptop computer. The battery 1624 may be a lithium ion battery, a lead-acid automotive battery, or a metal-air battery, such as a zinc-air battery, an aluminum-air battery, a lithium-air battery, a lithium polymer battery, and/or the like. In embodiments where the system 1600 is mounted in a fixed location, such as when the system is implemented as a server computer system, the system 1600 may have a power supply coupled to an electrical grid. In these embodiments, the system 1600 may include power tee circuitry to provide for electrical power drawn from a network cable to provide both power supply and data connectivity to the system 1600 using a single cable.

Power management integrated circuitry (PMIC) 1626 may be included in the system 1600 to track the state of charge (SoCh) of the battery 1624, and to control charging of the system 1600. The PMIC 1626 may be used to monitor other parameters of the battery 1624 to provide failure predictions, such as the state of health (SoH) and the state of function (SoF) of the battery 1624. The PMIC 1626 may include voltage regulators, surge protectors, power alarm detection circuitry. The power alarm detection circuitry may detect one or more of brown out (under-voltage) and surge (over-voltage) conditions. The PMIC 1626 may communicate the information on the battery 1624 to the processor circuitry 1602 over the IX 1606. The PMIC 1626 may also include an analog-to-digital (ADC) convertor that allows the processor circuitry 1602 to directly monitor the voltage of the battery 1624 or the current flow from the battery 1624. The battery parameters may be used to determine actions that the system 1600 may perform, such as transmission frequency, mesh network operation, sensing frequency, and the like.

A power block 1628, or other power supply coupled to an electrical grid, may be coupled with the PMIC 1626 to charge the battery 1624. In some examples, the power block 1628 may be replaced with a wireless power receiver to obtain the power wirelessly, for example, through a loop antenna in the system 1600. In these implementations, a wireless battery charging circuit may be included in the PMIC 1626. The specific charging circuits chosen depend on the size of the battery 1624 and the current required.

The system 1600 may include any combinations of the components shown by FIG. 16, however, some of the components shown may be omitted, additional components may be present, and different arrangement of the components shown may occur in other implementations. In one example where the system 1600 is or is part of a server computer system, the battery 1624, communication circuitry 1609, the sensors 1621, actuators 1622, and/or POS 1645, and possibly some or all of the I/O devices 1686 may be omitted.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes a method to be performed by a mobile device, the method comprising: rendering a graphical user interface (GUI) of an application, the GUI comprising one or more graphical objects; identifying a third part graphical object (TPGO) from among the one or more graphical objects, the TPGO being a graphical object that corresponds to a third party resource (TPR) and being a reference to the TPR, the TPR being a resource that is served by an entity separate from the application in response to activation of the TPGO; and applying a protective measure to the TPGO to prevent user inputs at or on the TPGO from being accepted by the mobile device, the protective measure also including a distinguishing effect to visually distinguish the TPGO from other graphical objects of the GUI.

Example 2 includes the method of example 1 and/or some other example(s) herein, wherein the protective measure is a wrapper or window overlaid on top of the TPGO.

Example 3 includes the method of examples 1-2 and/or some other example(s) herein, wherein: when the TPGO occupies a portion of the GUI, the protective measure is only applied to the portion of the GUI including the TPGO; and when the TPGO occupies an entirety of a display area of the mobile device, the protective measure also occupies an entirety of the display area.

Example 4 includes the method of examples 1-3 and/or some other example(s) herein, wherein the protective measure further includes a graphical control element (GCE), and the method includes: detecting a user interaction (UIA) with the GCE; and removing the protective measure from the TPGO in response to detection of the UIA, wherein removal of the protective measure allows user inputs at or on the TPGO to be being accepted by the mobile device and removes the distinguishing effect from the TPGO.

Example 5 includes the method of example 4 and/or some other example(s) herein, wherein the UIA is a tap-and-hold gesture for a predefined period of time, a tap-and-hold gesture and a slide gesture, or a flick gesture.

Example 6 includes the method of examples 1-5 and/or some other example(s) herein, wherein identifying the TPGO includes: in response to rendering the GUI, executing a locator strategy to locate GUI elements within the GUI, the GUI elements corresponding to a respective graphical object of the one or more graphical objects.

Example 7 includes the method of example 6 and/or some other example(s) herein, wherein the locator strategy is one of an XPath locator strategy, an element identifier (id) or resource id locator strategy, a class name locator strategy, a predicate string locator strategy, or an accessibility id locator strategy.

Example 8 includes the method of examples 1-7 and/or some other example(s) herein, wherein applying the protective measure to the TPGO includes: determining geometric and position parameters of the TPGO; and generating an overlay graphical object having a same geometric and position parameters as the determined geometric and position parameters of the TPGO.

Example 9 includes the method of examples 1-8 and/or some other example(s) herein, wherein applying the protective measure to the TPGO includes: collecting parameters of the application; and operating a machine learning model to determine a type of protective measure to be applied to the TPGO and a type of distinguishing effect to be applied to the protective measure, the collected parameters of the application being inputs to the machine learning model and outputs of the machine learning model being the type of protective measure and the type of distinguishing effect.

Example 10 includes the method of examples 1-9 and/or some other example(s) herein, wherein, identifying the TPGO includes: receiving an accessibility event indicating a presence of the TPGO in the application; and generating an overlay over the TPGO indicated by the accessibility event.

Example 11 includes a method of operating a mobile device comprising: operating application logic to cause a graphical user interface (GUI) to be displayed on a display device, and interpret at least some of the received touch inputs as interactions with the GUI; and operating protective measure logic to: identify a graphical object in the GUI to be overlaid with a guard, and applying the guard to the identified graphical object, the guard including a distinguishing effect to visually indicate the identified graphical object as being guarded, and the guard is to prevent the received touch inputs at or on the guard from being interpreted as inputs to the application logic.

Example 12 includes the method of example 11 and/or some other example(s) herein, wherein the method includes operating the protective measure logic to generate, as the guard, a window or overlay user interface element to be overlaid on top of the identified graphical object.

Example 13 includes the method of examples 11-12 and/or some other example(s) herein, wherein the guard includes a guard graphical object, and the method includes operating the protective measure logic to: interpret at least some of the received touch inputs at or on the guard graphical object as an unguard touch gesture; and remove the protective measure from the identified graphical object in response to determining that the touch gesture is a predefined touch gesture for removing the guard.

Example 14 includes the method of example 13 and/or some other example(s) herein, wherein the predefined touch gesture is a tap-and-hold gesture for a predefined period of time, a tap-and-hold gesture plus a slide gesture, or a flick gesture.

Example 15 includes the method of examples 11-14 and/or some other example(s) herein, wherein the guard includes a guard graphical object, and the method includes operating the protective measure logic to: interpret at least some of the received touch inputs at or on the guard graphical object as an unguard gesture, the unguard gesture being a predefined touch gesture for removing the guard; remove the distinguishing effect from the guard in response to determining that the touch gesture is the unguard gesture; and pass received touch inputs at or on the guard to the application for manipulation of the graphical object overlaid by the guard.

Example 16 includes the method of examples 11-15 and/or some other example(s) herein, wherein identifying the graphical object includes operating the protective measure logic to: execute a locator strategy to locate GUI elements within the GUI, the GUI elements corresponding to a respective graphical object of the one or more graphical objects, wherein the locator strategy is one of an XPath locator strategy, an element identifier (id) or resource id locator strategy, a class name locator strategy, a predicate string locator strategy, or an accessibility id locator strategy.

Example 17 includes the method of examples 11-16 and/or some other example(s) herein, wherein the protective measure logic is an accessibility service and identifying the graphical object includes operating the protective measure logic to: receive an accessibility event indicating a presence of the graphical object in the application; and generate an overlay over the graphical object indicated by the accessibility event.

Example 18 includes the method of examples 11-17 and/or some other example(s) herein, wherein applying the guard to the identified graphical object, the method includes operating the protective measure logic to: determine geometric and position parameters of the identified graphical object; and generate an overlay graphical object having a same geometric and position parameters as the determined geometric and position parameters of the TPGO.

Example 19 includes a mobile device comprising: a touch interface operable to receive touch inputs from a user of the mobile device; and processor circuitry communicatively coupled with the touch interface, the processor circuitry configurable to perform the method of any of examples 1-18

Example 20 includes a method to be operated by a computing system, the method comprising: obtaining user experience data (UXD) from a client device, the UXD indicating user interactions (UIAs) with one or more graphical elements in applications or webpages; operating an a machine learning (ML) to generate an ML model for the client device using the UXD as training data, wherein the ML model uses parameters of the applications or webpages as inputs and providing protective measures to be applied to the applications or webpages when running; and sending the ML model to the client device for predicting when and how to apply a protective measure to third party graphical objects in the applications or webpages.

Example 21 includes method of example 19 and/or some other example(s) herein, wherein the method includes operating one or more heuristic analysis engines to scan the applications or webpages for graphical objects to be displayed by the applications or webpages, and determine graphical objects over which protective measures should be placed based on the UXD.

Example 22 includes a computing system comprising: network interface circuitry, memory circuitry, and processor circuitry coupled with the network interface circuitry and the memory circuitry, wherein the processor circuitry is configurable or operable to perform the method of examples 20-21 and/or some other example(s) herein.

Example 23 includes the computing system of example 22 and/or some other example(s) herein, wherein the computing system is an application server, a web server, an ad server, a content delivery network (CDN) computing system, an edge computing system of an edge network, or a computing system of a cloud computing service.

Example Z01 includes one or more computer readable media comprising instructions, wherein execution of the instructions by processor circuitry is to cause the processor circuitry to perform the method of examples 1-23 and/or some other example(s) herein. Example Z02 includes a computer program comprising the instructions of example Z01 and/or some other example(s) herein. Example Z03 includes an Application Programming Interface defining functions, methods, variables, data structures, and/or protocols for the computer program of example Z02 and/or some other example(s) herein. Example Z04 includes an apparatus comprising circuitry loaded with the instructions of example Z01 and/or some other example(s) herein. Example Z05 includes an apparatus comprising circuitry operable to run the instructions of example Z01 and/or some other example(s) herein. Example Z06 includes an integrated circuit comprising one or more of the processor circuitry and the one or more computer readable media of example Z01 and/or some other example(s) herein. Example Z07 includes a computing system comprising the one or more computer readable media and the processor circuitry of example Z01 and/or some other example(s) herein. Example Z08 includes an apparatus comprising means for executing the instructions of example Z01 and/or some other example(s) herein. Example Z09 includes a signal generated as a result of executing the instructions of example Z01 and/or some other example(s) herein. Example Z10 includes a data unit generated as a result of executing the instructions of example Z01 and/or some other example(s) herein, wherein the data unit is a datagram, network packet, data frame, data segment, a Protocol Data Unit (PDU), a Service Data Unit (SDU), a message, or a database object. Example Z11 includes a signal encoded with the data unit of example Z10 and/or some other example(s) herein. Example Z12 includes an electromagnetic signal carrying the instructions of example Z01 and/or some other example(s) herein.

Example Z13 includes an apparatus comprising means for performing the method of examples 1-23 and/or some other example(s) herein.

Any of the above-described examples may be combined with any other example (or combination of examples), unless explicitly stated otherwise.

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, PLD, SoC, SiP, MCP, DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "module" may refer to, be part of, or include an FPGA, ASIC, PLD, SoC, SiP, MCP, a processor (shared, dedicated, or group) and/or memory (shared, dedicated, or group) that execute one or more software or firmware programs, a combinational logic circuit, and/or other suitable components that provide the described functionality.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, magnetoresistive RAM, phase change RAM (PRAM), DRAM and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. The term "interface circuitry" as used herein refers to, is part of, or includes circuitry that enables the exchange of information between two or more components or devices. The term "interface circuitry" may refer to one or more hardware interfaces, for example, buses, IO interfaces, peripheral component interfaces, network interface cards, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource. The term "gateway" as used herein refers to a network appliance that allows data to flow from one network to another network, or a computing system or application configured to perform such tasks. Examples of gateways may include IP gateways, Internet-to-Orbit (I2O) gateways, IoT gateways, cloud storage gateways, and/or the like. The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include cellular communication technology such as Third Generation Partnership Project (3GPP) Fifth Generation (5G) or New Radio (NR) and 3GPP Long Term Evolution (LTE), WiFi® Worldwide Interoperability for Microwave Access (WiMAX), or the like; Wireless Local Area Network (WLAN) or Wi-Fi® based technology IEEE 802.11 based protocol (e.g., IEEE 802.11ad, IEEE 802.11ay, etc.), Wireless Gigabit Alliance (WiGig), and the like; a device-to-device or personal area network (PAN) technology such as Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, a Low-Power Wide Area Network (LPWAN) such as those provided by Sigfox®; V2X communication technologies including 3GPP Cellular V2X, Dedicated Short Range Communications (DSRC) communication systems or Intelligent-Transport-Systems (ITS); among many others. The examples provided herein are thus understood as being applicable to various other communication technologies, both existing and not yet formulated.

As used herein, the term "user interface" or "UI" refers to the means in which a human controls a software application and/or a hardware device, and may include hardware UIs and/or software-based UIs. Hardware UIs are physical, spatial interfaces found on, or connected to, physical objects in the real world, and generally include buttons, control columns (e.g., joysticks), dials, knobs, levers, sliders, switches, touchscreens, tactile devices, and/or the like. software-based UIs refer to software elements related to controlling physical hardware elements and/or software elements used for human-computer interactions, and generally include text-based UIs such as command line interfaces (CLIs) and natural-language UIs, graphical user interfaces (GUIs), and/or the like. UIs may also include interfaces utilizing hardware and software elements such as gesture interfaces, motion tracking interfaces, and/or the like. As used herein, the term "graphical user interface" or "GUI" refers to a UI where users to interact with electronic devices through graphical icons, graphical control elements (GCEs) and audio indicators. As used herein, the term "graphical control elements" or "GCE" refers to graphics or image based interaction element, such as buttons, scroll bars, check boxes, drop-down lists, sliders, spinners, tabs, hyperlink text, text boxes, containers (e.g., windows, panels, frames, canvases, etc.), and/or the like. As used herein, the term "window" refers to a GCE that includes a visual area containing GUI elements, output of one or more processes, and/or inputs of one or more processes of a program to which it belongs and is framed by a border and/or a window decoration or non-client area (e.g., including a title bar and close, maximize, minimize, and re-size buttons and the like). In many implementations, windows can overlap with the area of other windows.

As used herein, the terms "instantiate," "instantiation," and the like may refer to the creation of an instance, and an "instance" may refer to a concrete occurrence of an object, which may occur, for example, during execution of program code. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like. The term "document" may refer to a computer file or resource used to record data, and includes various file types or formats such as word processing, spreadsheet, slide presentation, multimedia items, and the like. As used herein, the term "resource" refers to any identifiable physical, virtual/digital, or abstract object that are capable of being obtained or accessed over a network such as the Internet using a resource identifier (e.g., a uniform resource locator (URL), uniform resource identifier (URI), or the like).

Cloud computing refers to a paradigm for enabling network access to a scalable and elastic pool of shareable computing resources with self-service provisioning and administration on-demand and without active management by users. Computing resources are any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like).

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. Additionally, the terms "computer system" may be considered synonymous to, and may hereafter be occasionally referred to, as a computer device, computing device, computing platform, client device, client, mobile, mobile device, user equipment (UE), terminal, receiver, server, etc., and may describe any physical hardware device capable of sequentially and automatically carrying out a sequence of arithmetic or logical operations; equipped to record/store data on a machine readable medium; and transmit and receive data from one or more other devices in a communications network. The term "computer system" may include any type of electronic devices, such as a cellular phone or smart phone, tablet personal computer, wearable computing device, an autonomous sensor, laptop computer, desktop personal computer, a video game console, a digital media player, a handheld messaging device, a personal data assistant, an electronic book reader, an augmented reality device, server computer device(s) (e.g., stand-alone, rack-mounted, blade, etc.), and/or any other like electronic device.

The term "server" as used herein refers to a computing device or system, including processing hardware and/or process space(s), an associated storage medium such as a memory device or database, and, in some instances, suitable application(s) as is known in the art. The terms "server system" and "server" may be used interchangeably herein. that provides access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The invention claimed is:

1. One or more non-transitory computer-readable storage media (NTCRSM) comprising instructions, wherein execution of the instructions by a processor of a mobile device is to cause the mobile device to:
   render a graphical user interface (GUI) of an application, wherein the GUI includes one or more graphical objects;
   identify a third party graphical object (TPGO) from among the one or more graphical objects within the GUI, wherein the TPGO is a reference to a third party resource (TPR), and the TPR is a resource that is served by an entity separate from the application in response to activation of the TPGO; and
   apply a protective measure within the GUI and on top of the TPGO that is also within the GUI, wherein the applied protective measure is to prevent user inputs from being accepted by the mobile device at a region covered by the applied protective measure and the applied protective measure includes an obfuscation effect that visually distinguishes the applied protective measure from other graphical objects within the GUI.

2. The one or more NTCRSM of claim 1, wherein the protective measure is a wrapper or window overlaid on top of the TPGO.

3. The one or more NTCRSM of claim 1, wherein:
   when the TPGO occupies a portion of the GUI, the protective measure is only applied to the portion of the GUI including the TPGO; and
   when the TPGO occupies an entirety of a display area of the mobile device, the protective measure also occupies an entirety of the display area.

4. The one or more NTCRSM of claim 1, wherein the protective measure further includes a graphical control element (GCE), and execution of the instructions is to cause the mobile device to:
   detect a user interaction (UIA) with the GCE; and
   remove the protective measure from the TPGO in response to detection of the UIA, wherein removal of the protective measure allows user inputs at or on the TPGO to be being accepted by the mobile device and removes the obfuscation effect from the TPGO.

5. The one or more NTCRSM of claim 4, wherein the UIA is a tap-and-hold gesture for a predefined period of time, a tap-and-hold gesture and a slide gesture, or a flick gesture.

6. The one or more NTCRSM of claim 1, wherein, to identify the TPGO, execution of the instructions is to cause the mobile device to:
   in response to rendering the GUI, execute a locator strategy to locate GUI elements within the GUI, the GUI elements corresponding to a respective graphical object of the one or more graphical objects.

7. The one or more NTCRSM of claim 6, wherein the locator strategy is one of an XPath locator strategy, an element identifier (id) or resource id locator strategy, a class name locator strategy, a predicate string locator strategy, or an accessibility id locator strategy.

8. The one or more NTCRSM of claim 1, wherein, to apply the protective measure to the TPGO, execution of the instructions is to cause the mobile device to:
   determine geometric and position parameters of the TPGO; and
   generate an overlay graphical object having a same geometric and position parameters as the determined geometric and position parameters of the TPGO.

9. The one or more NTCRSM of claim 1, wherein, to apply the protective measure to the TPGO, execution of the instructions is to cause the mobile device to:

collect parameters of the application; and operate a machine learning model to determine a type of protective measure to be applied to the TPGO and a type of obfuscation effect to be applied to the protective measure, the collected parameters of the application being inputs to the machine learning model and outputs of the machine learning model being the type of protective measure and the type of obfuscation effect.

10. The one or more NTCRSM of claim 1, wherein, to identify the TPGO, execution of the instructions is to cause the mobile device to:

receive an accessibility event indicating a presence of the TPGO in the application; and generate an overlay over the TPGO indicated by the accessibility event.

11. A mobile device comprising:

a touch interface operable to receive touch inputs from a user of the mobile device; and processor circuitry communicatively coupled with the touch interface, the processor circuitry configurable to:

operate application logic to cause a graphical user interface (GUI) to be displayed on a display device, and interpret at least some of the received touch inputs as interactions with the GUI; and operate protective measure logic to:

identify a graphical object in the GUI to be overlaid with a guard; and apply the guard within the GUI and on top of the identified graphical object that is also within the GUI, the applied guard including an obfuscation effect at a region within the GUI covered by the guard to visually indicate the identified graphical object as being guarded, and the applied guard is to prevent the received touch inputs at or on the guard from being interpreted as inputs to the application logic.

12. The mobile device of claim 11, wherein the processor circuitry is configurable to operate protective measure logic to generate, as the guard, a window or overlay user interface element to be overlaid on top of the identified graphical object.

13. The mobile device of claim 11, wherein the guard further includes a guard graphical object, and the processor circuitry is configurable to operate protective measure logic to:

interpret at least some of the received touch inputs at or on the guard graphical object as an unguard touch gesture; and remove the protective measure from the identified graphical object in response to determining that the touch gesture is a predefined touch gesture for removing the guard.

14. The mobile device of claim 13, wherein the predefined touch gesture is a tap-and-hold gesture for a predefined period of time, a tap-and-hold gesture plus a slide gesture, or a flick gesture.

15. The mobile device of claim 11, wherein the guard further includes a guard graphical object, and the processor circuitry is configurable to operate protective measure logic to:

interpret at least some of the received touch inputs at or on the guard graphical object as an unguard gesture, the unguard gesture being a predefined touch gesture for removing the guard;

remove the obfuscation effect from the guard in response to determining that the touch gesture is the unguard gesture; and pass received touch inputs at or on the guard to the application for manipulation of the graphical object overlaid by the guard.

16. The mobile device of claim 11, wherein, to identify the graphical object, the processor circuitry is configurable to operate protective measure logic to:

execute a locator strategy to locate GUI elements within the GUI, the GUI elements corresponding to a respective graphical object of the one or more graphical objects, wherein the locator strategy is one of an XPath locator strategy, an element identifier (id) or resource id locator strategy, a class name locator strategy, a predicate string locator strategy, or an accessibility id locator strategy.

17. The mobile device of claim 11, wherein the protective measure logic is an accessibility service and, to identify the graphical object, the processor circuitry is configurable to operate protective measure logic to:

receive an accessibility event indicating a presence of the graphical object in the application; and generate an overlay over the graphical object indicated by the accessibility event.

18. The mobile device of claim 11, wherein, to apply the guard to the identified graphical object, the processor circuitry is configurable to operate protective measure logic to:

determine geometric and position parameters of the identified graphical object; and generate an overlay graphical object having a same geometric and position parameters as the determined geometric and position parameters of the TPGO.

* * * * *